(12) United States Patent
McCoy et al.

(10) Patent No.: US 8,905,375 B2
(45) Date of Patent: Dec. 9, 2014

(54) HIGH VACUUM BALL VALVE

(71) Applicant: A&N Corporation, Williston, FL (US)

(72) Inventors: Vernon McCoy, Williston, FL (US); James Loyal Owens, Jr., Morriston, FL (US); Adam Scott Davis, Bronson, FL (US)

(73) Assignee: A&N Corporation, Williston, FL (US)

( * ) Notice: Subject to any disclaimer, the term of this patent is extended or adjusted under 35 U.S.C. 154(b) by 0 days.

(21) Appl. No.: 13/843,003

(22) Filed: Mar. 15, 2013

(65) Prior Publication Data

US 2013/0221258 A1 Aug. 29, 2013

Related U.S. Application Data

(63) Continuation-in-part of application No. 12/966,767, filed on Dec. 13, 2010, now Pat. No. 8,496,227.

(60) Provisional application No. 61/285,585, filed on Dec. 11, 2009.

(51) Int. Cl.
  *F16K 5/06* (2006.01)
  *F16K 41/04* (2006.01)
  *F16K 25/04* (2006.01)
  *F16K 27/06* (2006.01)

(52) U.S. Cl.
  CPC ............ *F16K 5/0657* (2013.01); *F16K 5/0663* (2013.01); *F16K 41/046* (2013.01); *F16K 25/04* (2013.01); *F16K 5/0694* (2013.01); *F16K 27/067* (2013.01)

USPC .......................................... 251/214; 251/315.1

(58) Field of Classification Search
  USPC .......................... 251/214, 315.01–315.16, 366
  See application file for complete search history.

(56) References Cited

U.S. PATENT DOCUMENTS

| 3,722,856 | A | 3/1973 | Koch et al. |
| 4,558,874 | A | 12/1985 | Williams et al. |
| 5,577,709 | A | 11/1996 | Gugala et al. |
| 5,590,680 | A | 1/1997 | Gugala et al. |
| 6,076,831 | A | 6/2000 | Pfannenschmidt |
| 6,095,493 | A | 8/2000 | Velan |
| 7,249,751 | B2 | 7/2007 | Hall et al. |

FOREIGN PATENT DOCUMENTS

| DE | 3425557 | 1/1986 |
| EP | 1 467 132 | 10/2004 |

*Primary Examiner* — John Bastianelli
(74) *Attorney, Agent, or Firm* — Saliwanchik, Lloyd & Eisenschenk

(57) ABSTRACT

A ball valve having a valve stem assembly disposed within a valve body through-hole. The valve body through-hole is encircled with secondary bores to accommodate components of the valve stem assembly. The valve stem assembly includes an upper bearing and lower bearing, which are seated into corresponding secondary bores and a stem seal that seats within a stem seal gland. The upper bearing further includes a step that interdigitates with the stem seal gland to form a stem seal groove when the valve stem assembly is disposed within the through-hole.

50 Claims, 19 Drawing Sheets

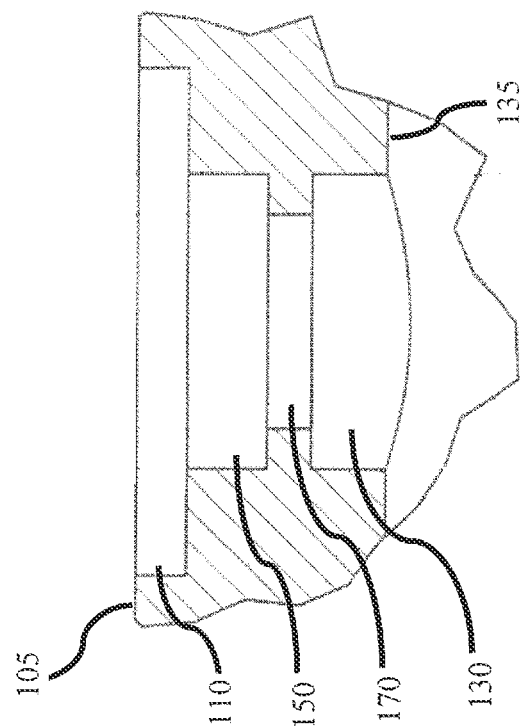
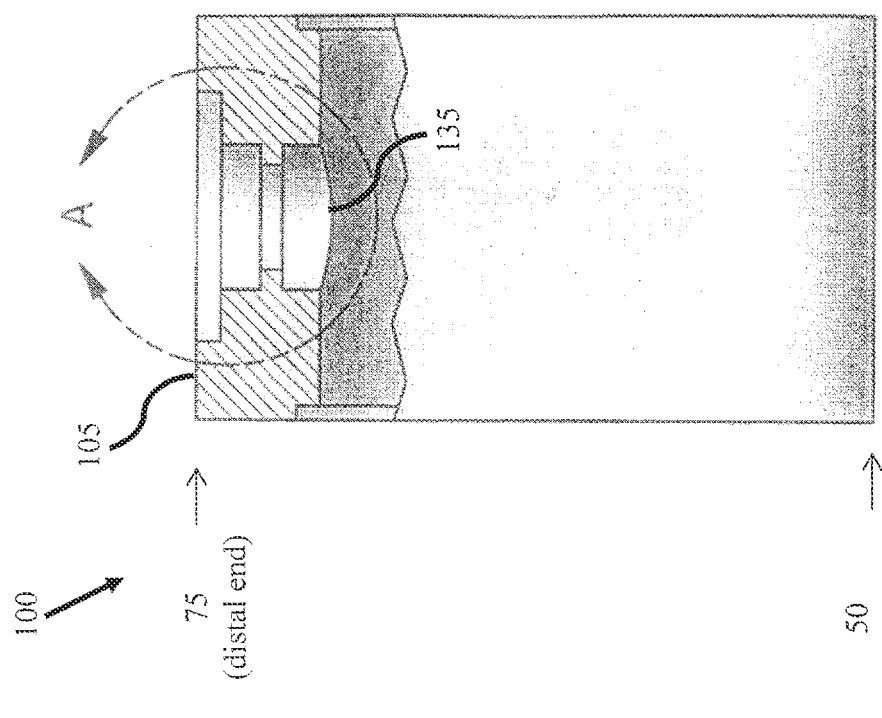
FIG. 4B
FIG. 4A

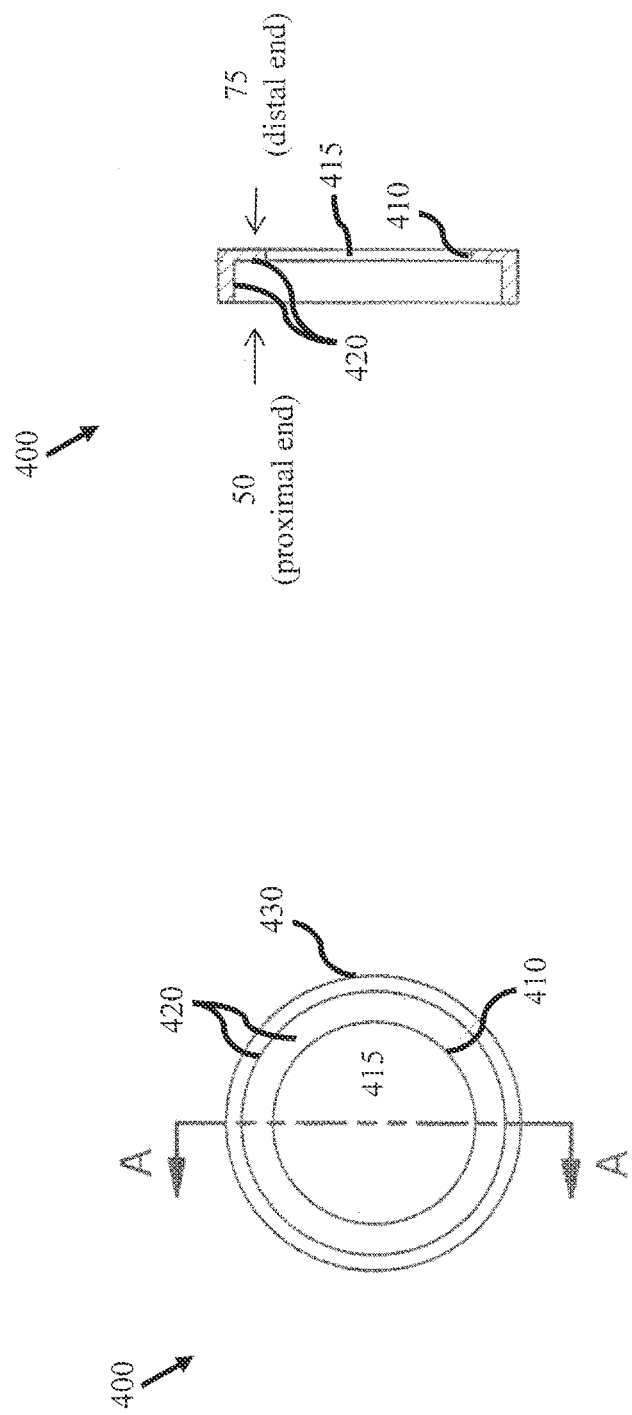

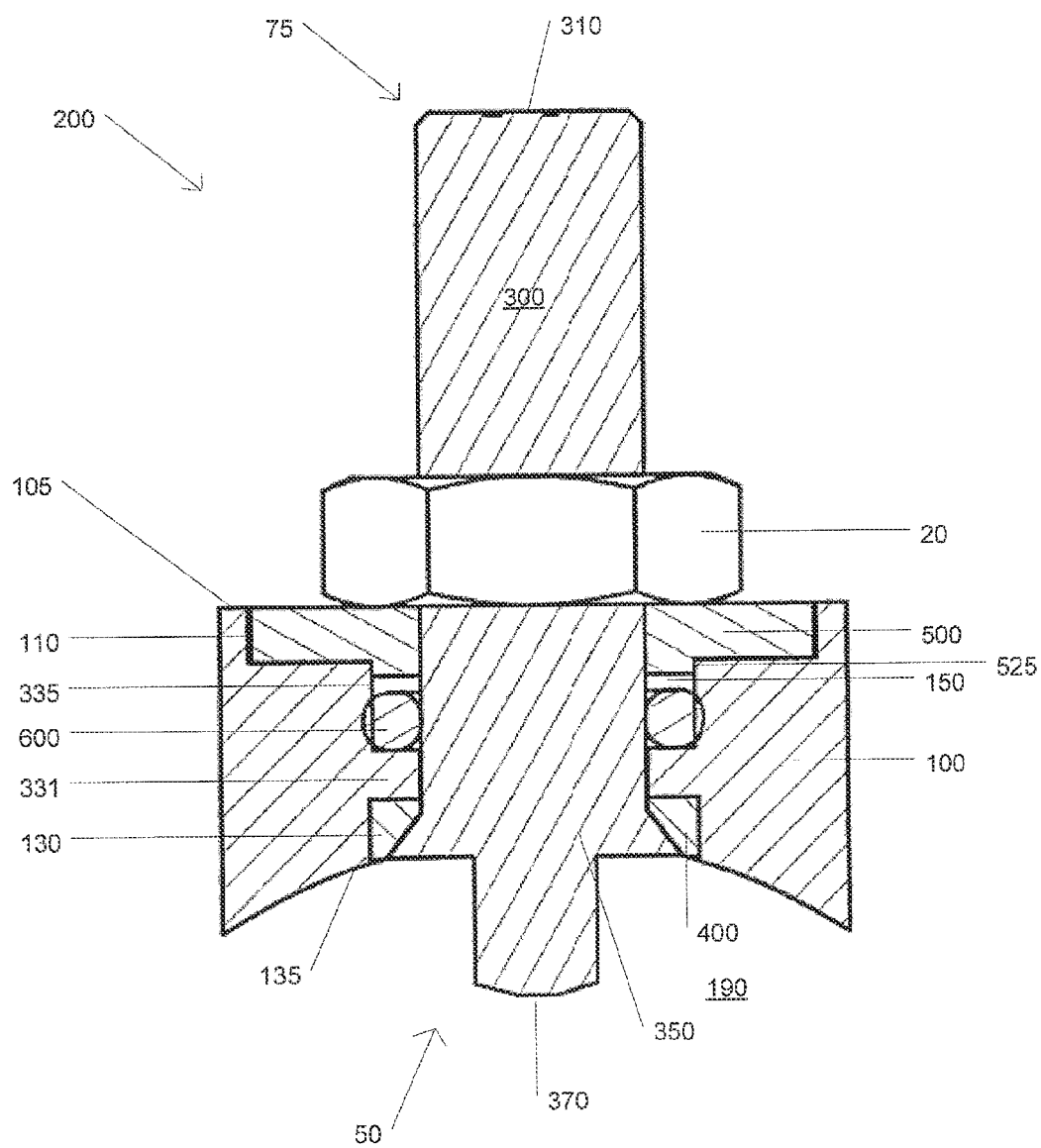

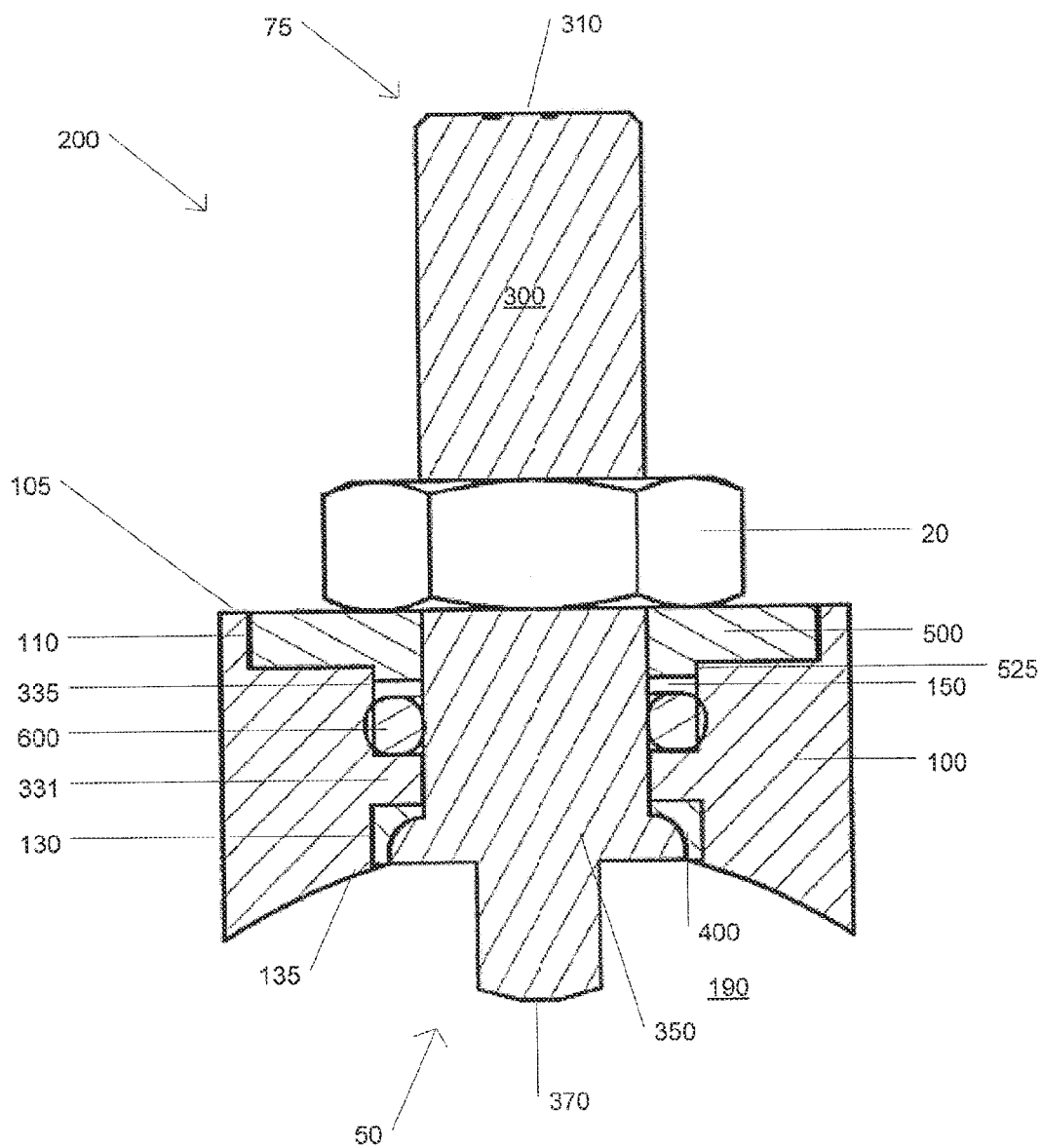

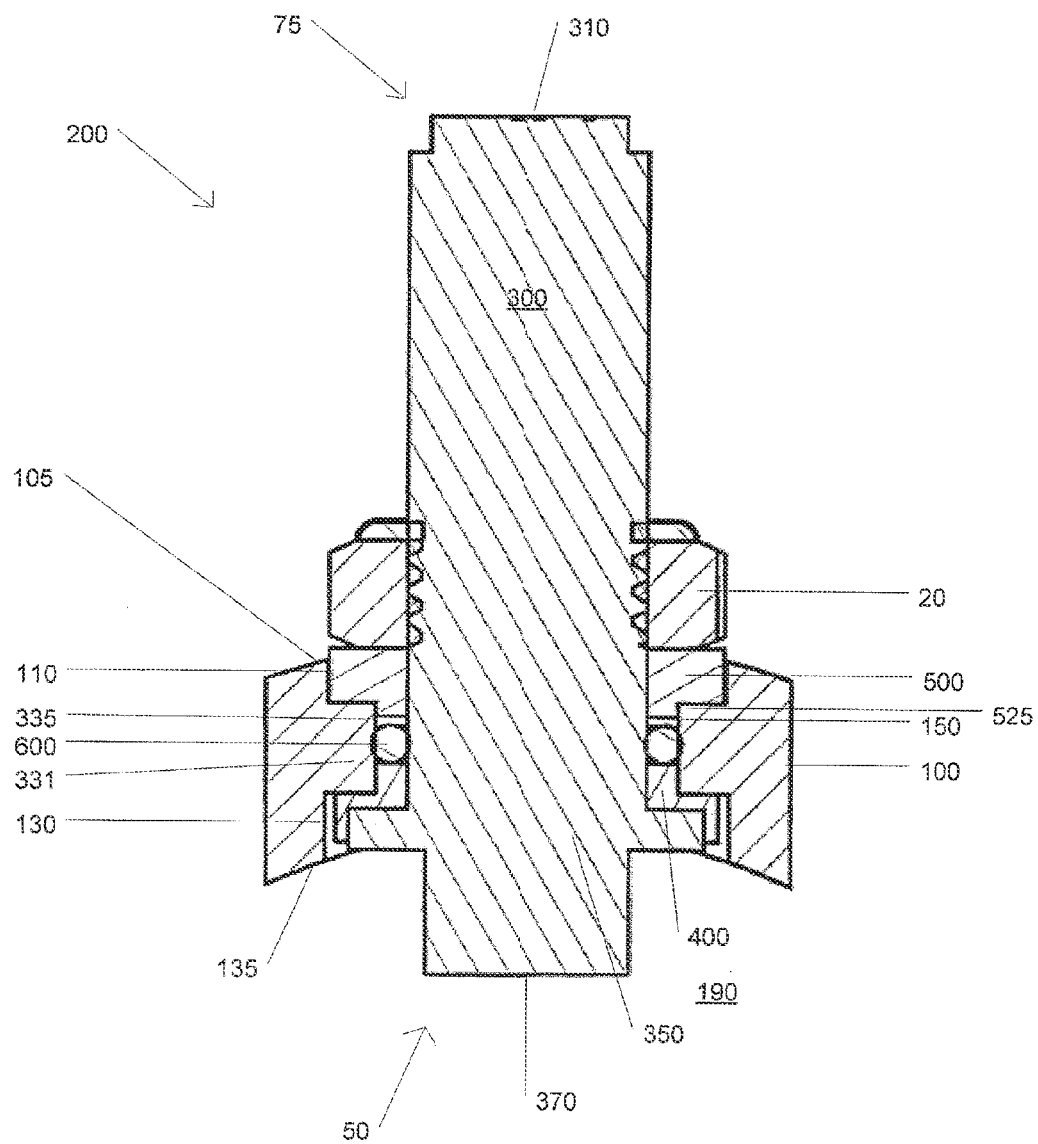

HIGH VACUUM BALL VALVE

CROSS-REFERENCE TO RELATED APPLICATIONS

The present application is a continuation-in-part of U.S. application Ser. No. 12/966,767, filed Dec. 13, 2010, which claims the benefit of U.S. Provisional Application Ser. No. 61/285,585, filed Dec. 11, 2009, both of which are hereby incorporated by reference herein in their entirety, including any figures, tables, or drawings.

BACKGROUND OF INVENTION

A ball valve is one of several types of "quarter-turn" closing valves. Such valves are usually held between two sealed connections and operate by the turning of a ball inside a valve body. The ball has a through hole or port that can be lined up with the open ends of the valve to permit flow. When the ball is turned, by an attached handle or other actuator, the port becomes smaller and blocks flow through the valve. Usually, if the ball is turned a full 90°, the port becomes perpendicular to the ends of the valve and blocks flow entirely. Variations can utilize a ball with more than one port, such that when the valve is turned, flow is redirected through a different valve and further turning can close off flow entirely. Larger valves with heavier balls, such as those used on pipelines or water mains may additionally use trunnions to help support the ball and prevent damage to internal components.

Ball valves are desirable for use in industry because they enable quick opening and a leak-proof closed seal. However, ball valves used in industrial applications are often exposed to various chemical compounds, liquid or gaseous, that can have a corrosive effect on the components, which can compromise the internal seals. It is not unusual for ball valves used in industry to be exposed to excessive temperatures (below 0° F. to over 1000° F.) and pressure ($10^{-10}$ mm Hg to over 100 PSI). Most often, the seals between the central valve stem and the stem seal are the most vulnerable. A common implementation of stem seals to those skilled in the art is an o-ring. For the purposes of this discussion, the terms stem seal and o-ring are interchangeable.

Elevated temperatures are particularly problematic and can have the greatest effect because of expansion of the stem seal material. Various specialized metallic or elastomeric materials have been developed to withstand the chemical or environmental extremes for each application. Valve body designs have also been improved to accommodate for stem seal expansion within the valve gland. Nonetheless, extrusion of the stem seal material into surrounding spaces during temperature-induced expansion is still a problem. Further, it can have a deleterious effect not only on the integrity of the stem seal, but on the surrounding components with which the expanding stem seal material comes into contact.

As technology changes and develops, ball valves are increasingly utilized in a greater variety of industrial applications. As such, it is necessary for ball valve seals to withstand a multitude of conditions, including even greater temperature extremes and corrosive conditions. There is a need for a ball valve design capable of withstanding high temperature and high pressure conditions with minimal or no leakage. More particularly, there is a need for a ball valve design that can provide the necessary leakage control at different temperatures and accommodate for temperature- or chemical-induced expansion of stem seal materials.

BRIEF SUMMARY

Embodiments of the subject invention pertain to a ball valve with improved leak-proof components. A specific embodiment pertains to a ball valve that can utilize non-metallic materials and an improved valve body to achieve leak-proof seals around the valve stem and valve body. Embodiments of the subject ball valve can utilize non-metallic upper bearings and lower bearings and an improved stem seal seated in a valve gland to achieve a leak-proof seal. Advantageously, ball valves in accordance with the subject invention can be configured for use in a variety of applications by changing the material(s) utilized for the stem seal.

More specific embodiments can include a stem seal positioned within a valve gland having dimensions that significantly eliminate or reduce extrusion of the stem seal material between the valve stem and valve body and provide ideal compression of the stem seal. Still other embodiments have an upper bearing that can include a counter-sunk lip that extends into the gland. Further embodiments can include a lower bearing cup that can fit over the lower end of the valve stem to stabilize the valve stem and prevent lateral movement of the lower portion of the valve stem.

Thus, embodiments of the subject invention provide a ball valve with increased resistance to temperature- or chemical-induced stem seal leakage. The advantages of various embodiments of the subject ball valve include, but are not limited to, the ability of the valve gland and surrounding bearings to confine the stem seal and prevent improper extrusion into surrounding spaces and to stabilize the valve stem and reduce lateral stem movement.

Various embodiments of a valve in accordance with the subject invention, such as embodiments shown in FIGS. 1A, 7A-7F, 8A-8F, and 9, can incorporate a valve body, where the valve body has a through hole that passes through a wall of the valve body from an outer wall surface to an inner wall surface. The proximal end of the through hole is an opening in the inner wall surface and a distal end of the through hole is an opening in the outer wall surface. The through hole can have a body gland section positioned proximal to the outer wall surface, where the body gland section has a circular cross-section having a first radius. The through hole also can have a body midsection having a circular cross-section having a second radius. Note, FIG. 7E shows an embodiment without a body midsection. The through hole also has a lower seat positioned between the body midsection and the inner wall surface, where at least a portion of the lower seat has a third radius, such that the second radius is smaller than the first radius and the second radius is smaller than the third radius.

The valve also incorporates a valve stem, where the valve stem has a head proximate a proximal end of the valve stem, a stem midsection having a circular cross-section, and a stem gland section. The stem midsection is between the head and the stem gland section. Note, FIG. 7E shows an embodiment without a stem midsection. At least a portion of the stem gland section has a circular cross-section, such that the stem seal is in contact with a portion of the stem glad section having a circular cross-section. Preferably, the entire stem gland section has a circular cross-section. The valve body and the valve stem are adapted such that a distal end of the valve stem can enter the proximal end of the through hole and pass into the through hole such that at least a portion of the head is in the lower seat. At least a portion of the head has a head radius that is larger than the second radius, which prevents the stem from passing all the way through the through hole. The head and the lower seat are adapted such that a lower bearing cup can be positioned such that the lower bearing cup prevents contact between a head outer surface and a lower seat inner surface when the valve stem is fully inserted into the through hole. FIGS. 1A and 8A-8F show embodiments using various shaped lower bearing cups. The stem gland section and the body gland section are adapted such that a stem seal can be positioned around the stem gland section so as to be in contact with a stem gland section outer surface around a circumference of the stem gland section and, when the valve stem is fully inserted into the through hole, the stem seal is positioned in a stem seal gland. The stem seal gland is formed by the stem gland section outer surface, a body gland section inner surface, a proximal stem seal gland face, and a distal stem seal gland face. The proximal stem seal gland face is a distal face surface of the body midsection. For case of description, when describing the various surfaces of the sections of the valve stem, the through hole, the lower bearing cup, and the upper seal, (i) outer edge surface can refer to a surface having at least a portion facing at least partially to the outside of the part. In specific embodiments, some outer edge surfaces have a normal that is substantially perpendicular, if not perpendicular, to the longitudinal axis of the stem and to the longitudinal axis of the through hole, (ii) inner edge surface is similar to outer edge surface but faces in toward the longitudinal axis of the through hole and/or the longitudinal axis of the stem, (iii) face can refer to a surface of a part that has at least a portion that faces at least partially toward the distal or proximal direction, where a distal face is at the distal end of the part and a proximal face is at the proximal end of the part. In specific embodiments, some faces have normals that are substantially parallel, if not parallel, to the longitudinal axis of the through hole and/or stem. When (i) the valve stem is fully inserted into the through hole, (ii) the stem seal is positioned around the stem gland section so as to be in contact with the stem gland section outer surface around a circumference of the stem gland section, (iii) the stem seal is positioned in the stem seal gland, and (iv) a pressure differential is applied between a first region distal to the outer wall surface and a second region proximal to the inner wall surface such that a first pressure of the first region is higher than a second pressure of the second region, a first seal is created between the stem seal and the stem gland section outer surface and a second seal is created between the stem seal and the body gland section inner surface. The creation of the first and second seal maintains the pressure differential between the first region distal to the outer wall surface and the second region proximal to the inner wall surface. The first seal and the second seal are maintained as the valve stem is rotated about a longitudinal axis of the valve stem with respect to the valve body.

The lower seat can have a variety of cross-sectional shapes, depending on the shape of the lower bearing cup, and preferably has a circular cross-section. In a specific embodiment, when the distal end of the valve stem enters the proximal end of the through hole and passes into the through hole such that at least a portion of the head is in the lower seat, the distal end of the valve stem extends past the outer wall surface. This can allow a handle or other mechanism to interconnect with, and rotate, the stem.

Although the head outer surface can have a variety of shapes, in a specific embodiment, the head outer surface has a head face and a head outer edge surface, and the lower seat inner surface has a lower seat face and a lower seat inner edge surface, such that the lower bearing cup prevents contact between the head face and the lower seat face and prevents contact between the head outer edge surface and the lower seat inner edge surface when the valve stem is fully inserted into the through hole.

The lower bearing cup can have a face portion and an edge portion, such that when the valve stem is fully inserted into the through hole the lower bearing cup is positioned so as to prevent contact between the head face and the lower seat face and to prevent contact between the head outer edge surface and the lower seat inner edge surface, wherein the edge portion contains lateral movement of the head with respect to the lower seat. The edge portion keeps lateral movement of the head with respect to the lower seat to below or equal to a maximum lateral movement, wherein lateral movement above the maximum lateral movement leads to improper extrusion of the stem seal between the stem gland section outer surface and the proximal stem seal gland face. This is because if too large a lateral movement is allowed between the head and the lower seat, where lateral movement is perpendicular to the longitudinal axis of the stem and/or the longitudinal axis of the through hole, the stem seal will extrude between the stem and the valve body, which tends to break the seal. In a specific embodiment, wherein the head has a circular cross-section having a head radius, the lower seat has a circular cross-section having the third radius, and the difference between the head radius and the third radius is less than or equal to a thickness of the edge portion of the lower bearing cup plus the maximum lateral movement.

A specific embodiment relates to a ball valve, where the valve stem has a protrusion extending proximally from the head such that when the valve stem is fully extended into the through hole the protrusion extends proximally past the inner wall surface and engages the ball such that when the valve stem is rotated about a longitudinal axis of the valve stem the ball rotates.

In a specific embodiment, such as shown in FIG. 7A, the through hole can have an upper section having a circular cross-section having a fourth radius, where the upper section is distal to the body seal gland section, the fourth radius is the same as the second radius, and a proximal face of the upper section is the proximal stem seal gland face. In other embodiments, the fourth radius is not the same as the second radius.

An upper bearing can be positioned between the stem and the valve body at a position distal to the stem seal when the valve stem is fully inserted into the through hole and the pressure differential is applied. The upper bearing, in combination with the lower bearing cup, prevents contact between the valve stem and the through hole. The upper bearing, in combination with the lower bearing cup, can also maintain the stem seal gland in a proper position to avoid improper extrusion of the stem seal.

The through hole can have an upper seat, where the upper seat has a radius at least as large as the second radius at each position around a circumference of the upper seat, where at least a portion of the upper bearing is positioned in the upper seat when the valve stem is fully inserted into the through hole. The upper seat can provide a place for all or a portion of an upper bearing and can provide a structure to prevent the upper bearing from allowing too much lateral movement of the stem relative to the valve body above the stem seal. In an embodiment, the upper bearing in combination with the lower bearing cup prevents contact between the valve stem and the through hole as the valve stem is rotated up to 90 degrees about a longitudinal axis of the valve stem. In specific embodiments, such as shown in FIG. 1A, at least a portion of a proximal face of the upper bearing is the proximal stem seal gland face. The upper bearing can have a main upper bearing body and a step at a proximal end of the upper bearing. The step can be positioned in the body gland section when the valve stem is fully inserted into the through hole such that an outer edge surface of the step contacts a portion of an inner radial surface of the body gland section that is continuous with an inner radial surface of the stem seal gland, wherein a proximal face of the step is the distal stem seal gland face. FIG. 1A shows such an embodiment.

The step, in combination with the lower bearing cup, can prevent contact between the stem midsection outer surface and a body midsection inner surface by keeping lateral movement of the stem with respect to the body gland section to below or equal to a maximum lateral movement. Lateral movement above the maximum lateral movement can lead to improper extrusion of the stem seal between the stem gland section outer surface and the proximal stem seal gland face and should be avoided. In a specific embodiment, the step has an annular cross-section having an inner step radius and an outer step radius, where the difference between the inner step radius and a radius of a section of the stem that contacts the step plus the difference between the first radius and the outer step radius is less than or equal to the maximum lateral movement.

Referring to FIG. 7E, an embodiment without a body midsection or a stem midsection is shown. In an embodiment, the valve has a valve body, with the valve body having a through hole that passes through a wall of the valve body from an outer wall surface to an inner wall surface. A proximal end of the through hole is an opening in the inner wall surface and a distal end of the through hole is an opening in the outer wall surface. The through hole has a body gland section positioned proximal to the outer wall surface, where the body gland section has a circular cross-section having a first radius, and a lower seat positioned between the body gland section and the inner wall surface, where at least a portion of the lower seat has a second radius, and the second radius is larger than the first radius. The valve also has a valve stem, where the valve stem has a head proximate a proximal end of the valve stem, and a stem gland section, where at least a portion of the stem gland section has a circular cross-section, and the stem gland section is distal to the head. The valve body and the valve stem are adapted such that a distal end of the valve stem can enter the proximal end of the through hole and pass into the through hole such that at least a portion of the head is in the lower seat. At least a portion of the head has a head radius that is larger than the first radius. The head and the lower seat are adapted such that a lower bearing cup can be positioned such that the lower bearing cup prevents contact between a head outer surface and a lower seat inner surface when the valve stem is fully inserted into the through hole. The stem gland section and the body gland section are adapted such that a stem seal can be positioned around the stem gland section so as to be in contact with a stem gland section outer surface around a circumference of the stem gland section and when the valve stem is fully inserted into the through hole the stem seal is positioned in a stem seal gland, wherein the stem seal gland is formed by the stem gland section outer surface, a body gland section inner surface, a proximal stem seal gland face, and a distal stem seal gland face. When (i) the valve stem is fully inserted into the through hole, (ii) the stem seal is positioned around the stem gland section so as to be in contact with the stem gland section outer surface around a circumference of the stem gland section, (iii) the stem seal is positioned in the stem seal gland, and (iv) a pressure differential is applied between a first region distal to the outer wall surface and a second region proximal to the inner wall surface such that a first pressure of the first region is higher than a second pressure of the second region, a first seal is created between the stem seal and the stem gland section outer surface and a second seal is created between the stem seal and the body gland section inner surface. The first and second seal maintain the pressure differential between the first region distal to the outer wall surface and the second region proximal to the inner wall surface. The first seal and the second seal are maintained as the valve stem is rotated about a longitudinal axis of the valve stem with respect to the valve body. Again, in a specific embodiment, the head outer surface can have a head face and a head outer edge surface, and the lower seat inner surface has a lower seat face and a lower seat inner edge surface, such that the lower bearing cup prevents contact between the head face and the lower seat face and prevents contact between the head outer edge surface and the lower seat inner edge surface when the valve stem is fully inserted into the through hole. In a specific embodiment, such as shown in FIG. 7E, the lower bearing cup provides the proximal stem seal gland face.

In specific embodiments, the lower bearing cup, in combination with an upper bearing, can constrain lateral movement of the head of the stem with respect to the lower seat and constrain lateral movement of the stem with respect to the valve body, above the stem seal, so as to limit rotation of the stem with respect to the valve body such that the angle between the longitudinal axis of the stem and the longitudinal axis of the valve body is maintained less than 5°, maintained less than 4°, and/or maintained less than 3°. In order to accomplish this, tolerances for the lower bearing cup, upper bearing and parts in contact with the same can be less than or equal to 0.004 inches.

BRIEF DESCRIPTION OF DRAWINGS

In order that a more precise understanding of the above recited invention can be obtained, a more particular description of various embodiments of the subject invention will be rendered by reference to specific embodiments thereof that are illustrated in the appended drawings. It should be understood that the drawings presented herein may not be drawn to scale and that any reference to dimensions in the drawings or the following description are specific to the embodiments disclosed. Any variations of these dimensions that will allow embodiments of the subject invention to function for its intended purpose are considered to be within the scope of the subject invention. Thus, understanding that these drawings depict only typical embodiments of the invention and are not therefore to be considered as limiting in scope, embodiments of the invention will be described and explained with additional specificity and detail through the use of the accompanying drawings in which:

FIGS. 4A and 4B are a partial cut-away and an enlarged cross-sectional view, respectively, of a valve body that can be utilized with embodiments of the subject invention. FIG. 4A shows the right side of the valve body partially cut-away to reveal the structure of the through hole in the valve body. FIG. 4B is an enlarged view of encircled portion "A" in FIG. 4A showing through hole structure in more detail.

FIGS. 5A and 5B are a front elevation view and a cut-away view through line A-A of a right side elevation, respectively, of the lower bearing of one embodiment of the subject invention.

FIGS. 8A-8F show six embodiments similar to the embodiment shown in FIG. 1A, where the shape of the lower bearing cup, head of the valve stem, and the lower seat have been modified with respect to the embodiment shown in FIG. 1A.

FIG. 9 shows an embodiment similar to the embodiment shown in FIG. 1A, where the shape of the lower bearing cup, upper bearing, head of the valve stem, and the lower seat have been modified with respect to the embodiment shown in FIG. 1A. The threaded tightening component is also cross-sectioned.

DETAILED DISCLOSURE

Embodiments of the subject invention pertain to devices and methods for achieving a leak-proof valve stem assembly. More specifically, the embodiments of the subject invention pertain to a valve stem assembly that can be utilized at temperatures between approximately 20° C. and 200° C. without leakage of the various components.

The following description will disclose embodiments that are particularly useful in the field of quarter-turn valve assemblies, in particular ball valve devices. However, a person with skill in the art will be able to recognize numerous other uses for which the embodiments of the subject invention would be applicable. While the subject application describes a particular use in ball valve devices, other modifications apparent to a person with skill in the art and having benefit of the subject disclosure are contemplated to be within the scope of the embodiments of the present invention.

Also, as used herein, and unless otherwise specifically stated, the terms "operable communication" and "operably connected", or the like, means that the particular elements are connected in such a way that they cooperate to achieve their intended function or functions. The "connection" may be direct, or indirect, physical or remote.

In addition, references to "first", "second", and the like (e.g., first and second surface), as used herein, and unless otherwise specifically stated, are intended to identify a particular feature of which there are at least two. However, these references are not intended to confer any order in time, structural orientation, or sidedness (e.g., left or right) with respect to a particular feature.

In accordance with the subject invention, the following particularly described examples are intended to be illustrative only since numerous modifications and variations therein will be apparent to those skilled in the art. As used in the specification and in the claims, the singular for "a," "an" and "the" include plural referents unless the context clearly dictates otherwise.

Figure 1A:
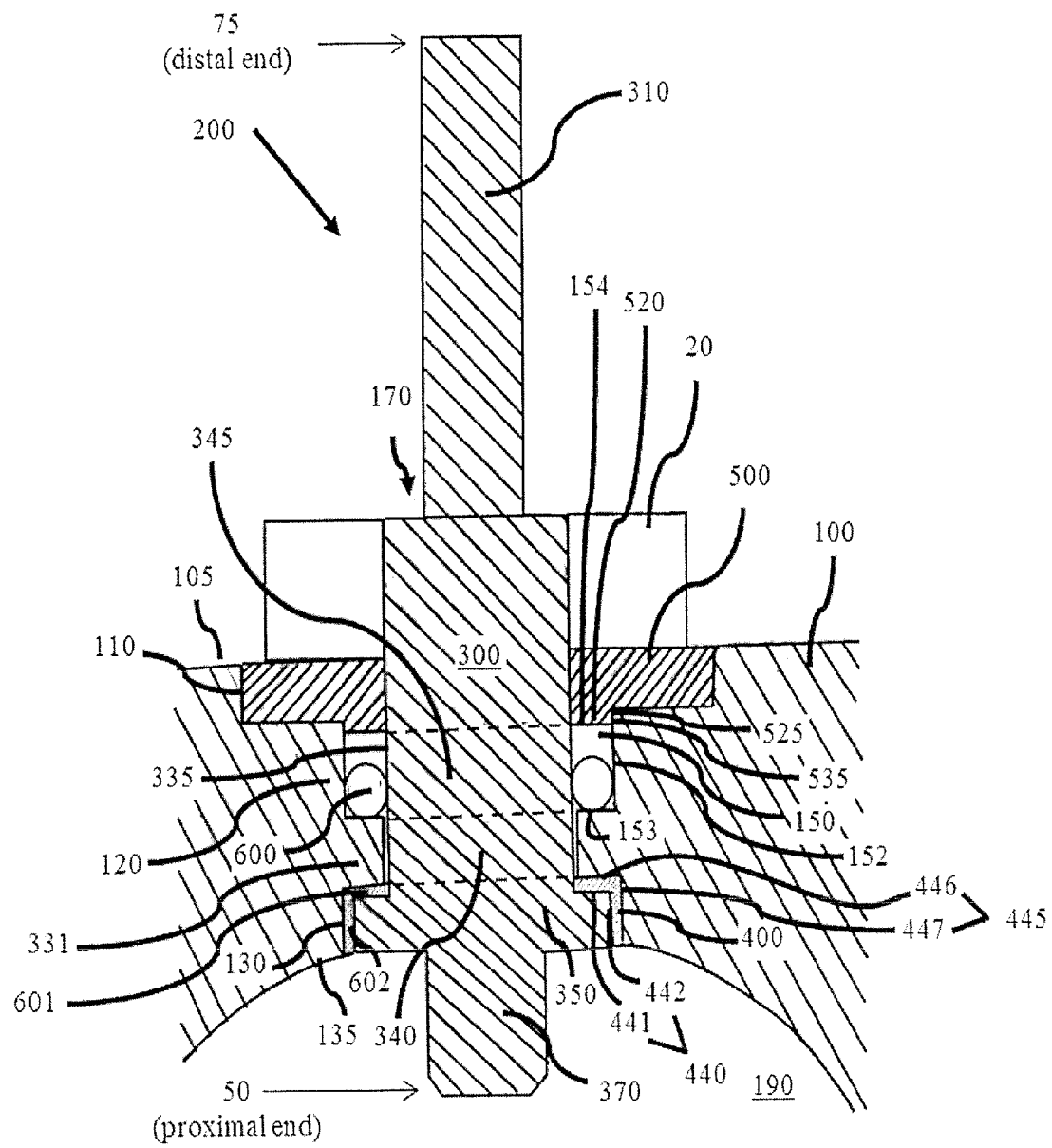
FIG. 1A is a front cross-sectional view of one embodiment of the subject invention with the valve stem assembly seated within a valve body.

With reference to the attached figures, which show certain embodiments of the subject invention, it can be seen in FIG. 1A that one embodiment comprises, in general, a valve body 100 having an upper seat 110, a lower seat 130, a valve gland, or stem seal gland, 150, a central through-hole 170, and a bore 190. Within the through-hole 170, a valve stem assembly 200 is seated that includes a valve stem 300, a lower bearing cup 400, an upper bearing 500, and a stem seal 600, each configured to be operably installed within the through-hole 170 such that the valve stem 300 can be operable attached to a ball valve 900 (not shown) positioned within the bore 190. For literary convenience, the description of the embodiments of the subject invention will be made with reference to the proximal end 50 and the distal end 75, which are shown positionally on the Figures for reference purposes.

Most valve body 100 configurations include a bore 190 for containing a valve ball and a through-hole 170 for containing the valve stem assembly 200 that can have an operable contact with the valve ball. In general, a valve ball has a central passage or port for conducting flow between the two open ends of the bore. There are several types of valve balls, including, but not limited to, full port, reduced port, and V-port, which are all known to those with skill in the art. Further, there are several types of valve bodies known to those with skill in the art, including, but not limited to, single body, three piece body, split body, top entry and welded. One embodiment of the valve stem assembly that will be disclosed herein utilizes a single body valve construction with a full port valve ball. However, it should be understood that substitution of alternative valve bodies and/or valve balls, other than those specifically exemplified herein, are contemplated to be within the scope of the herein disclosed embodiments of the subject invention.

The through-hole 170 can be defined as that volume between the upper edge 105 and the lower edge 135, examples of which are shown in FIGS. 1A, 4A-4B, 8A-8F, and 9. In a particular embodiment, the diameter of the through-hole 170 is between 0.554 inches and approximately 0.558 inches, at the portion of the through-hole 170 having the smallest diameter. In a specific embodiment, the diameter of the through-hole 170 is approximately 0.556 inches, at the portion of the through-bore having the smallest diameter. In the embodiment shown in FIG. 1A, the portion of the through-hole 170 having the smallest diameter can be referred to as the midsection 331. Surrounding the through-hole 170 there can also be an upper seat 110, a stem seal gland 150 that is contiguous with the upper seat 110, and a lower seat 130. An example of this embodiment can be seen in FIGS. 1A and 4B. The details of the through-hole 170 will be discussed below in relation to the lower bearing 400, upper bearing 500, and stem seal 600 mated therewith.

Figures 1, 3B:
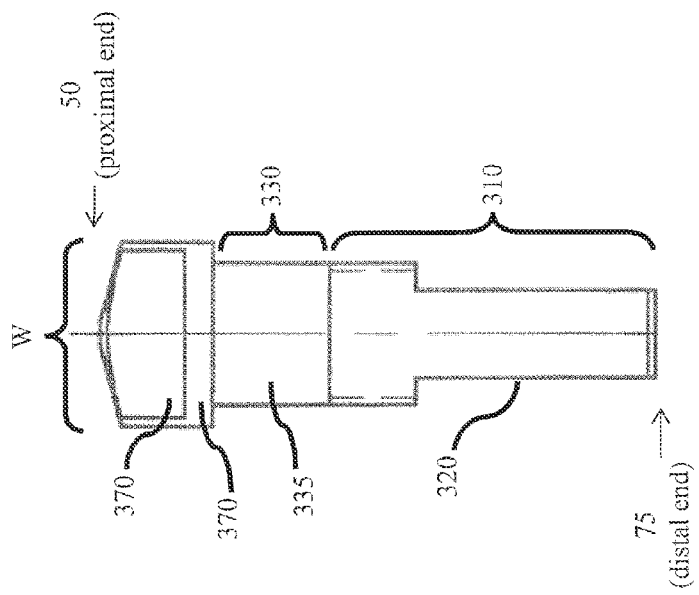
FIGS. 3A, 3B-1, 3B-2, and 3C are a perspective view, front elevation view, a distal end plan view, and a right side elevation view, respectively, of one embodiment of the valve stem of the subject invention.
Figures 2, 3B:
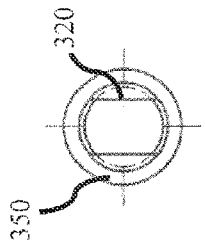
Figure 3A:
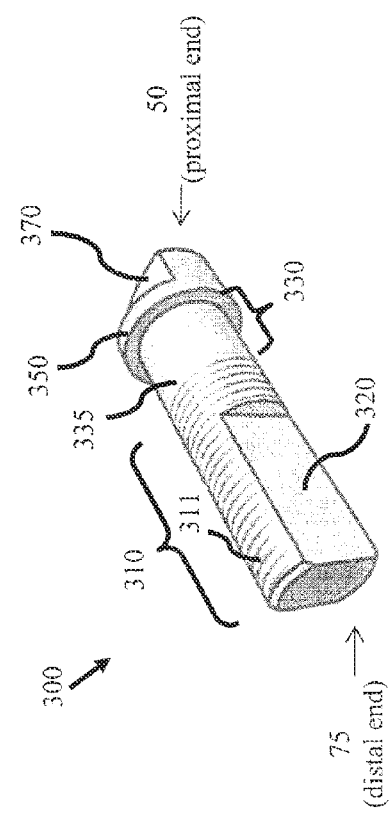
Figure 3C:
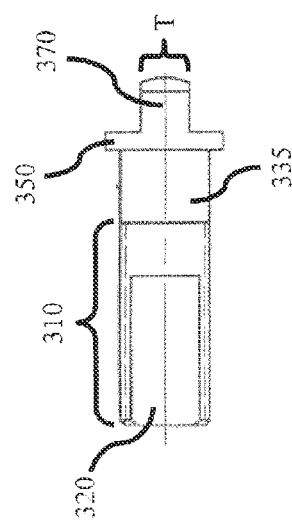

Positioned collinearly with the through-hole 170 is a valve stem 300. The valve stem 300 can be an elongated rod having a first narrow end 310, a medial sealing area 330 supported by one or more seals, a head 350, and second narrow end 370. In the embodiment shown in FIG. 1A, the first end 310 has a portion that is narrow for interconnecting with a handle and the second end has a portion that is narrow for allowing interconnection with the ball. In specific embodiments, ends 310 and 370 need not be narrow, but can have a variety of shapes and sizes that allow the valve stem 300 to be inserted into the through-hole 170 without passing all the way through in at least one orientation. FIGS. 3A, 3B, and 3C illustrate one valve stem assembly 200 that can be utilized with embodiments of the subject invention. In this embodiment, the valve stem 300 is sufficiently long enough to allow the first end 310 to extend past the upper edge 105 and second narrow end 370 to extend past the lower edge 135. In other specific embodiments, the first end 310 need not extend past the upper edge 105, and an interconnection with a handle for rotating the valve stem 300 about a longitudinal axis of the valve stem 300 without the need for the first end 310 to extend past the upper edge 105. Likewise, in specific embodiments, the second end 370 need not extend past the lower edge 135, and an interconnection can be made between the valve stem 300 and ball of the ball valve that allows the ball to be rotated about the longitudinal axis of the valve stem 300 by rotating the valve stem 300 about the same longitudinal axis. In a specific embodiment, the valve stem 300 is between approximately 2.0 inches and 2.2 inches in total length from the distal end 75 to the proximal end 50 and can have a diameter of between 0.50 inches and 0.55 inches. In a more specific embodiment, the valve stem 300 is approximately 2.145 inches in total length from the distal end 75 to the proximal end 50 and can have a diameter of approximately 0.548 inches. Advantageously, the diameter of the valve stem 300 in this specific embodiment can reduce stretching of the stem seal 600 and can contribute to achieving an ideal stem seal 600 compression of 15%, as will be discussed below. In a specific embodiment, the dimensions of the valve stem 300 and stem seal gland are such that a pre-loading compression factor of 10-20% is achieved for the stem seal 600, where after loading, e.g., applying a vacuum in the bore 190, the compression factor increases to create a better seal. In further specific embodiments, the pre-loading compression factor is in the range 12-18%, and/or the range 14-16%.

In one embodiment, the first narrow end 310 includes ridges, nibs, teeth, threads or similar projections that are compatible with at least one tightening component 20. In a specific embodiment, the first narrow end 310 has threads 311 to accommodate at least one compatibly threaded tightening component 20 that can be screwed onto, or otherwise engaged with, the complete valve stem assembly 200 for compressing and maintaining pressure on the components to ensure a leak-proof seal. Such a threaded tightening component 20 can comprise any of a variety of devices known to those with skill in the art. For example, a tightening component 20 can include a typical hex or square nut, a prevailing torque lock nut (frequently used in high temperature applications), wing nut, locking nut or any similar device. In a specific embodiment, the threading on the first narrow end 310 extends for a length of approximately 1.250 inches from the distal end 75.

Alternatively, a tightening component can comprise a ratchet-like configuration, known to those with skill in the art. In this embodiment, a pawl nut or flange can be engaged with one or more teeth or ridges on the first narrow end 310. Pushing the pawl nut onto the first narrow end 310 causes it to engage with the teeth, which are slanted to prevent backward motion of the pawl nut. A person with skill in the art would be able to devise any of a variety of methods and devices for compressing and maintaining pressure on the valve stem assembly 200 components of the herein described embodiments of the subject invention. Such variations are contemplated to be within the scope of the embodiments of the subject invention. Examples include, but are not limited to, a cotter pin and/or a tapered stem.

In a further embodiment, the circumferential shape of the first narrow end 310 is such that it can be operably connected to an actuator, handle, or lever capable of turning the valve stem 300. It is well known in the art, that it is the turning, or rotating, of the valve stem 300 about a longitudinal axis of the valve stem 300 that turns the ball so as to control the flow through the ball valve. Oftentimes, the turning of the valve stem 300 is performed with the use of a handle or lever operably attached to the first narrow end 310 to provide torque. To facilitate this, the shape of the first narrow end 310 can be such that it interdigitates, or otherwise interconnects, with the attachment mechanism of the handle or lever, not unlike a wrench and nut combination. In one embodiment, at least a portion of the first narrow end 310 has a face 320. In a more particular embodiment, at least a portion of two opposite sides of the first narrow end 310 incorporates a face 320, as seen, for example in FIGS. 3A and 3B. In alternative embodiments, at least a portion of more than two sides comprise flat faces 320. In one embodiment, the one or more flat faces 320 can be cooperatively-engaged with a handle or lever. In a specific embodiment, each flattened side is approximately 0.920 inches in length from the distal end 75 of the first narrow end 310. In a further specific embodiment, at least a portion of the first narrow end 310, nearest the medial sealing area 330 remains circular, as seen in FIGS. 3A-3C, which can ensure adequately engagement with the tightening component 20.

The medial sealing area 330 is, in one embodiment, that portion of the valve stem 300 that is positioned within the through-hole 170 and encircled by at least some portion of each of the lower bearing 400, upper bearing 500, and the stem seal gland 150, when the valve stem assembly 200 is fully constructed. The portion of the valve stem 300 that matches up with the stem seal gland 150 can be referred to as the stem gland section of the valve stem 300, the portion of the valve stem 300 that matches up with the body midsection can be referred to as the stem midsection, the portion of the valve stem 300 that matches up with the lower seat 130 of the valve body can be referred to as the head 350, and the portion of the valve stem 300 that matches up with the upper seat 110 can be referred to as the stem upper section. The diameter of the medial sealing area 330 can vary, of course, depending upon several factors, including, but not limited to, the size of the through-hole 170, location of the bearings and the stem seal gland 150, type of sealing surface, and other factors that would be known to those with skill in the art. In one embodiment, the medial sealing area 330 has a length of between 0.40 inches and 0.50 inches and a diameter of between 0.53 inches and 0.55 inches. In a specific embodiment, the medial sealing area 330 has a length of approximately 0.450 inches and a diameter of approximately 0.5484 inches.

In a further embodiment, the lower bearing 400, upper bearing 500, and stem seal 600 encircle and can be, at least partially, in contact with a sealing surface 335 on the exterior of the medial sealing area 330. In an alternative embodiment, lower bearing 400, the upper bearing 500, and stem seal 600 encircle the sealing surface 335, but only the stem seal 600 is in full contact around the entire circumference of the sealing surface. The sealing surface can be configured with any of a multitude of one or more textures or finishes that can engender it with adequate sealing capabilities. A person with skill in the art would be able to determine a suitable texture or finish suitable for a sealing surface. In a specific embodiment, the sealing surface is a generally smooth, continuous surface, as shown, for example in FIG. 3A.

To assist with maintaining placement of the valve stem assembly 200 within the through-hole 170 and compression of the valve stem assembly 200 components, the valve stem 300 can further incorporate a head 350 that can be nearer to the proximal end 50 of the medial sealing area 330. When the valve stem assembly 200 is constructed, the head 350 can be positioned within the lower seat 130 of the valve body 100. FIG. 1A shows an example of this arrangement. In one embodiment, the outer diameter of the head 350 is larger than the outer diameter of the medial sealing area 330. By the head 350 of the stem having an outer diameter than a diameter of at least a portion of the through-hole 170 in at least one direction, the head 350 prevents the stem from passing through the through-hole 170 in at least that direction. In a further embodiment, the head 350 has a circular outer circumference. However, a person with skill in the art would understand that the head 350 can have any of a variety of outer circumferential shapes including, but not limited to, oval, square, triangular, rectangular, or any other polygonal shape. Examples of various embodiments are shown in FIGS. 1A, 8A-8F, and 9. When the tightening component 20 is applied to the first narrow end 310, the head 350 can exert a counter force that can maintain the position of the valve stem assembly 200 within the through-hole 170 and assist with compression of the valve stem 300 components. The dimensions of a head 350 can be variable depending upon a variety of factors that are known to those with skill in the art, including, but not limited to, the circumferential shape of the head 350, the valve stem 300 material, the amount of compression to be applied to the valve stem components, the dimensions of the second narrow end 370, discussed below, and other factors. In a particular embodiment, the head 350 has a circular circumference with an outer diameter of between 0.70 inches and 0.72 inches and a length from the distal end 75 to the proximal end 50 of between 0.110 inches and 0.115 inches. In a specific embodiment, the head 350 has a circular circumference with a diameter of approximately 0.715 inches and a length from the distal end 75 to the proximal end 50 of approximately 0.113 inches.

Following the head 350 is a second narrow end 370 located at the most proximal end 50 of the valve stem 300. The second narrow end 370 can engage with a slot, groove, channel, or other opening on the ball valve and facilitates turning of the ball valve when an actuator that operably connected to the first narrow end 310 is turned. The second narrow end 370 can have any of a variety of shapes or configurations that are compatible with slot or groove on a ball valve, including slide-in or interlocking connections. In specific embodiments, portions of, or all of, the second narrow end 370 can extend wider than the head 350 extends. In further specific embodiments, the head 350 and second narrow end 370 are shaped such that the distal end 75 of the valve stem 300 can be inserted into the central through hole 170 from the proximal end and pass through and exit the distal end of the central through hole 170. A person with skill in the art, having benefit of the subject application, would be able to determine an appropriate configuration for the second narrow end 370. Any and all such variations thereof are contemplated to be within the scope of the various embodiments of the subject invention.

In one embodiment, the second narrow end 370 is, in general, a projecting tab that extends from the proximal end 50 of the head 350, for example, as shown in FIGS. 3A and 3C. In this embodiment, the shape of the second narrow end 370 allows it to engage with a slot within a ball valve. As such, it should be understood that the dimensions of the second narrow end 370 can be variable, depending upon factors that are apparent to those with skill in the art. In one particular embodiment, the second narrow end 370 has a length from the distal end 75 to the proximal end 50 of between 0.30 inches and 0.35 inches, a total width W across the head 350 of between 0.70 inches and 0.72 inches, and a thickness of between approximately 0.150 inches and approximately 0.155 inches. This embodiment can be modified to create another embodiment having a thickness between 0.250 inches and 0.350 inches. In a more specific embodiment, an example of which is shown in FIGS. 3B-1 and 3C, the second narrow end 370 has a length from the distal end 75 to the proximal end 50 of approximately 0.332 inches, a total width W across the head 350 of approximately 0.715 inches, and a thickness T of approximately 0.153 inches. This embodiment can be modified to have a thickness T of approximately 0.305 inches.

As mentioned above, turning of the actuator operably attached to the first narrow end 310 controls flow through the ball valve. The actuator is often, but not necessarily, an elongated handle or lever mechanism that has a portion thereof shaped to operably attach to the first narrow end 310 of the valve stem 300. The actuator can be manually or pneumatically or electropneumatically controlled. In one embodiment, the alignment of the first narrow end 310, with regard to the second narrow end 370, permits the actuator to be attached so that, when the port is aligned with the open ends of the valve, allowing flow, the actuator is also inline or generally parallel with the valve. This can allow the position of the valve to be easily determined by visual inspection. Conversely, when the actuator is turned 90°, to be generally perpendicular with the valve, the port is also turned and effectively closed, as indicated by the position of the actuator.

As mentioned above, the valve stem 300 can be positioned within a through-hole 170 within the valve body 100. Surrounding the through-hole 170 there can be one or more secondary bores into which different sealing components can be seated to prevent leakage through the through-hole 170. In one embodiment, these secondary bores can include an upper seat 110, a lower seat 130, and a stem seal gland 150. In a further embodiment, the valve assembly 200 includes the valve stem 300 and these sealing components that can be positioned within their respective secondary bores.

Starting from the proximal end 50 of the through-hole 170, it can be seen in the embodiment shown in FIG. 1A that a lower seat 130 surrounds the through-hole 170 and is contiguous with the bore hole 190. The head 350 of the valve stem 300 can be seated within the lower seat 130. To promote proper alignment and fit between the head 350 and the lower seat 130, a lower bearing cup 400, such as that shown in FIGS. 5A-B, can be positioned between the head 350 and the lower seat 130, for example, as shown in FIG. 1A. Thus, the dimensions of the lower seat 130 can be such that the head 350 and the associated lower bearing cup 400 can be placed therein with minimal clearance. This can aid in stabilizing the valve stem 300, reducing or preventing contact between the head 350 and the lower seat 130. In one embodiment, the lower seat 130 is generally circular with a diameter of between 0.780 inches and 0.820 inches. In a specific embodiment, the lower seat 130 is generally circular with a diameter of approximately 0.800 inches.

In one embodiment, referring to FIGS. 5A and 5B, the lower bearing cup 400 has a central valve stem opening 415 with an inner surface 410 that surrounds the medial sealing surface at or about where it meets the head 350. The lower bearing cup 400 can then cover the distal end, or face, 75 of the head 350 and extend down over the side, or edge, of the head 350 towards the proximal end 50, such that it fills, most, or substantially all, of the space between the outer surface of the side, or edge, of the head 350 and the inner surface of the lower seat 130. The lower bearing cup 400 also prevents, or reduces, contact between the face of the head 350 and the face of the lower seat 130. In a further embodiment, the lower bearing cup 400 extends beyond the proximal side 50 of the head 350. FIG. 1A shows an example of a lower bearing cup 400 positioned around the head 350 within the lower seat 130. FIGS. 5A and 5B illustrate an embodiment of a lower bearing cup 400 that can be utilized in accordance with the subject invention, as described. In this embodiment, the lower bearing cup 400 is circular. However, as mentioned above, the circumferential shape of the head 350 can be any of a variety of circumferential shapes including, but not limited to, oval, square, triangular, rectangular, or any other polygonal shape. Therefore, it should be understood that the lower bearing cup 400 can have any shape compatible with the shape of the head 350 and the corresponding lower seat 130 that ensures a snug fit.

The lower bearing cup 400 shown in FIG. 5B has a circular outer edge contour and a circular inner edge contour, resulting in a uniform thickness of lower bearing cup 400 positioned between the lower seat 130 inner edge surface and the head 350 outer edge surface, which allows the cup to freely slide against the inner edge surface of the lower seat 130 and the outer edge surface of the stem head 350. In other embodiments, the lower bearing cup 400 can have a non-circular outer edge contour, which matches a similar inner edge surface contour of the lower seat 130, and a circular inner edge surface so as to allow the outer edge surface of the head 350 to freely slide with respect to the inner edge surface of the lower bearing cup 400 while maintaining the relative position of the outer edge surface of the lower bearing cup 400 and the inner edge surface of the lower seat 130. Conversely, the lower bearing cup 400 can have a non-circular inner edge contour, which matches a similar outer edge contour of the head 350, and a circular outer edge contour so as to allow the inner edge surface of the lower seat 130 to slide freely with respect to the outer edge surface of the lower bearing cup 400 while maintaining the relative position of the outer edge surface of the head 350 and the inner edge surface of the lower bearing cup 400. The non-circular contours can be selected from a variety of shapes such as polygonal, square, rectangular, hexagonal, or any other shape which would be apparent to one skilled in the art. Preferably, at least the outer edge contour or the inner edge contour of the lower bearing cup 400 is circular to allow the valve stem 300 to rotate while maintaining proper valve stem 300 alignment within the through hole.

Figure 8A:
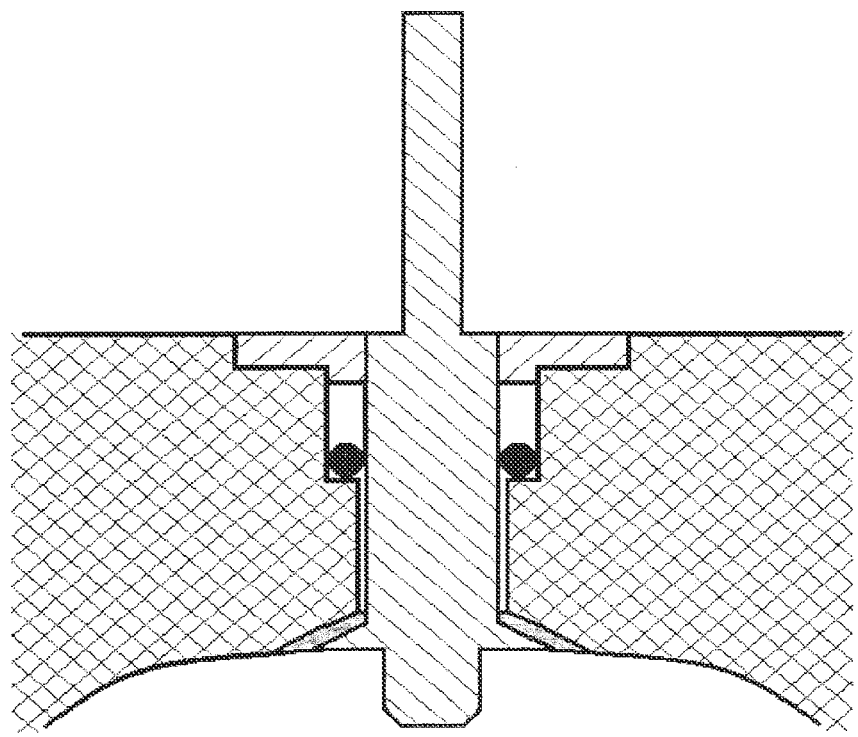
Figure 8B:
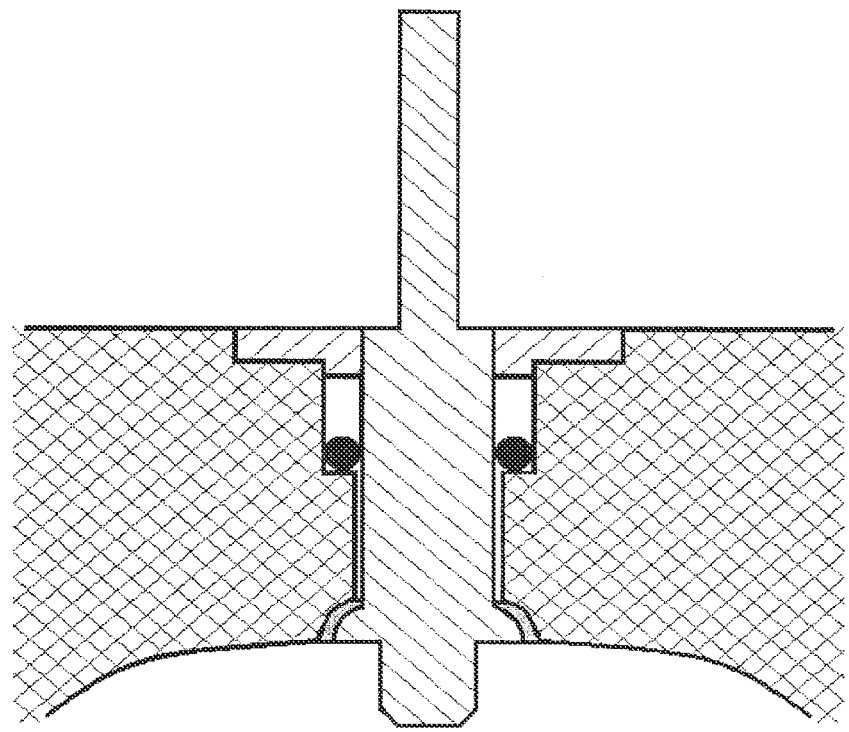

In a preferred embodiment, the lower bearing cup 400 prevents contact between the outer edge surface of the head 350 and the inner edge surface of the lower seat 130, and prevents contact between the proximal face of the lower seat 130 and the distal face of the head 350. In further embodiments, the inner surface of the lower seat 130 has a curved surface as the surface travels from the proximal portion of the lower seat 130 to the distal portion. In such embodiments, examples of which are shown in FIGS. 8A and 8B, the lower bearing cup 400 prevents more than a certain amount of lateral, or radial, movement of the head 350 toward the inner edge of the lower seat 130 under normal operating conditions and prevents more than a certain amount of longitudinal movement of the valve stem 300 toward the inner edge of the lower seat 130 in a direction parallel to the longitudinal axis of the valve stem 300 under normal operating conditions.

Figure 7A:
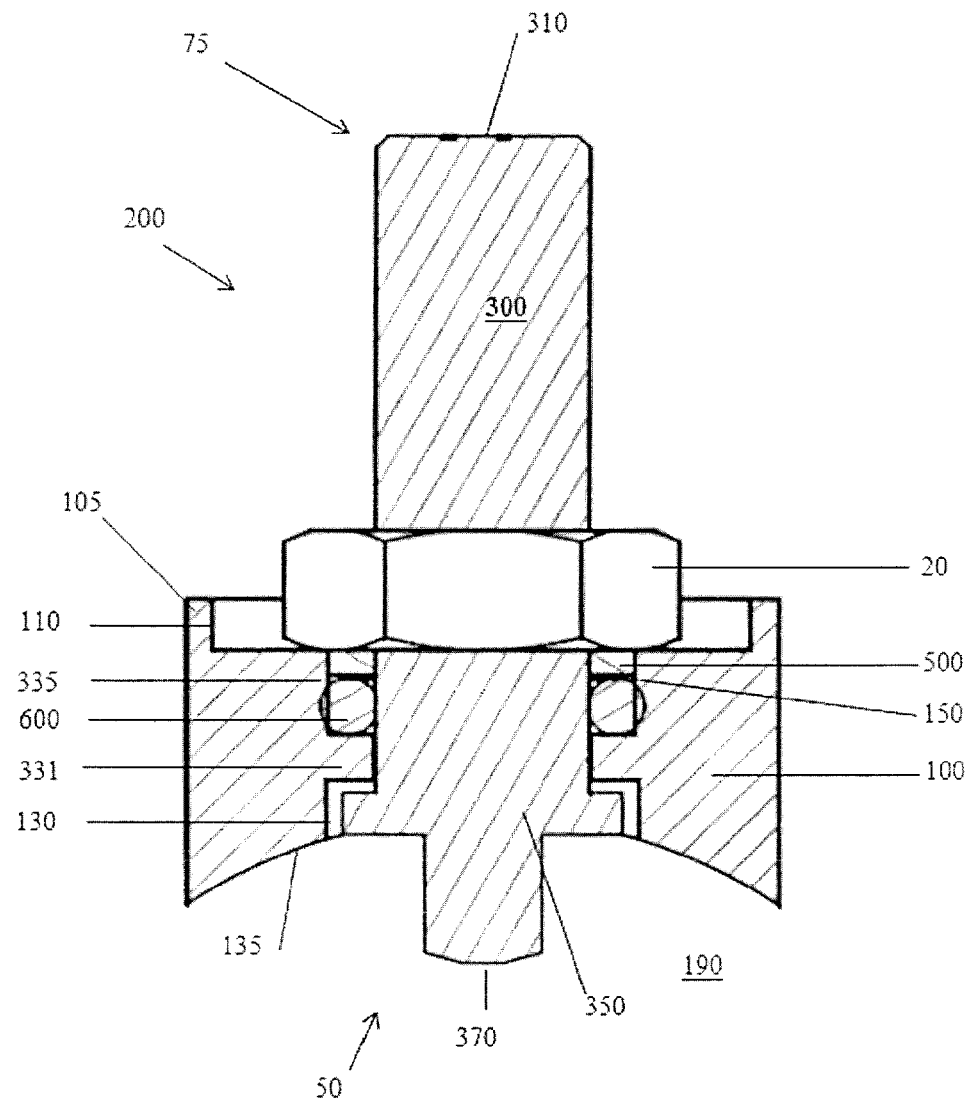
FIGS. 7A-7F show various embodiments of the subject invention that modify one or more aspects of the embodiment shown in FIG. 1A.
Figure 7B:
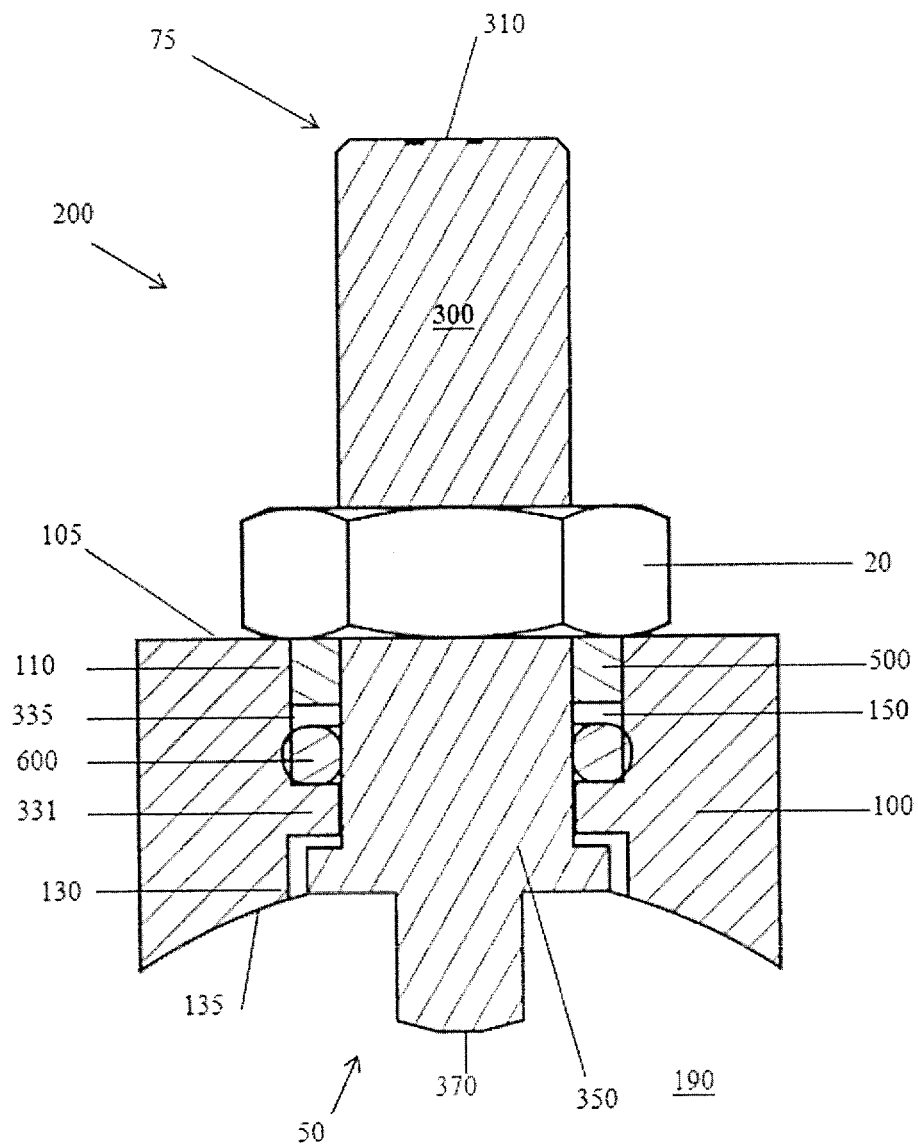
Figure 7C:
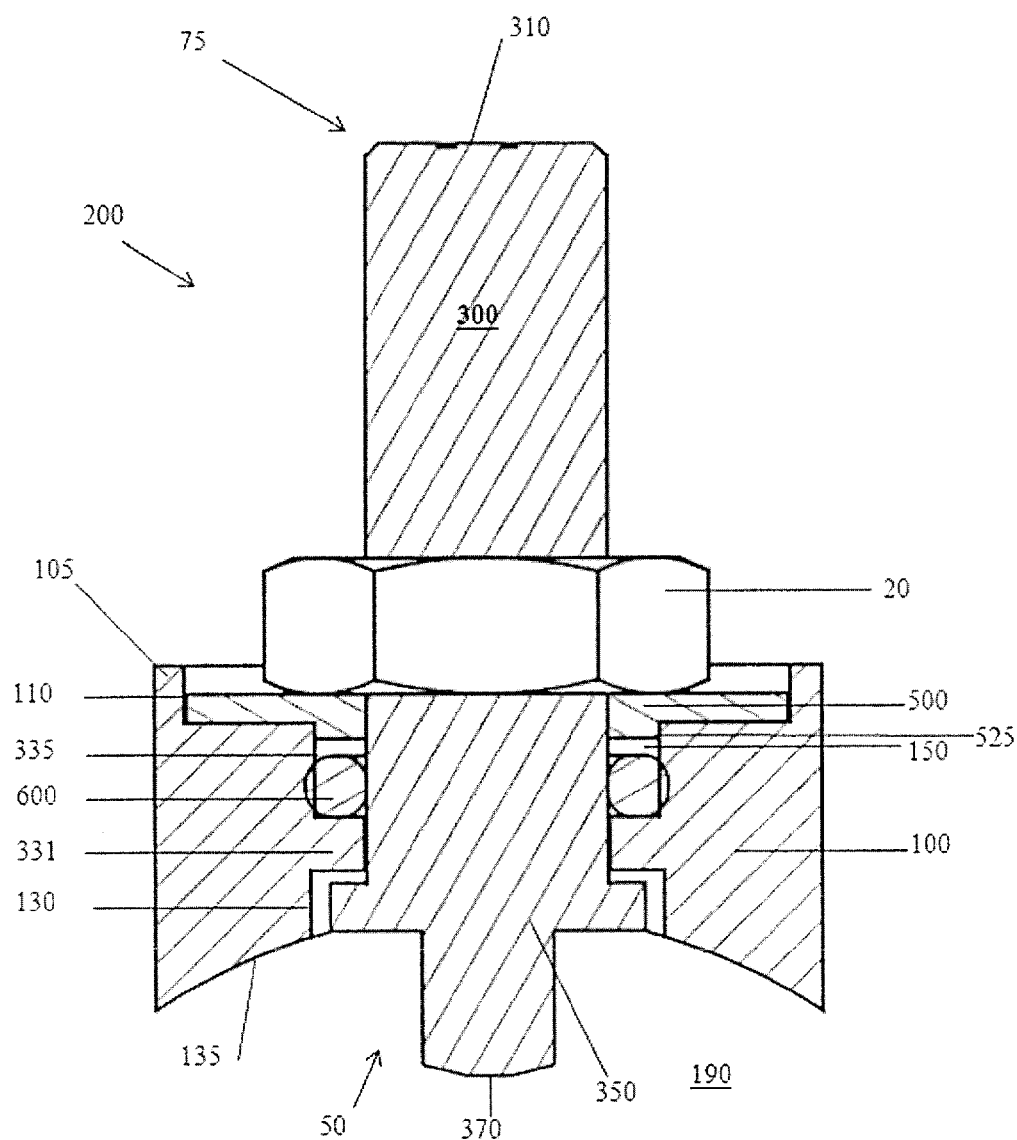
Figure 7D:
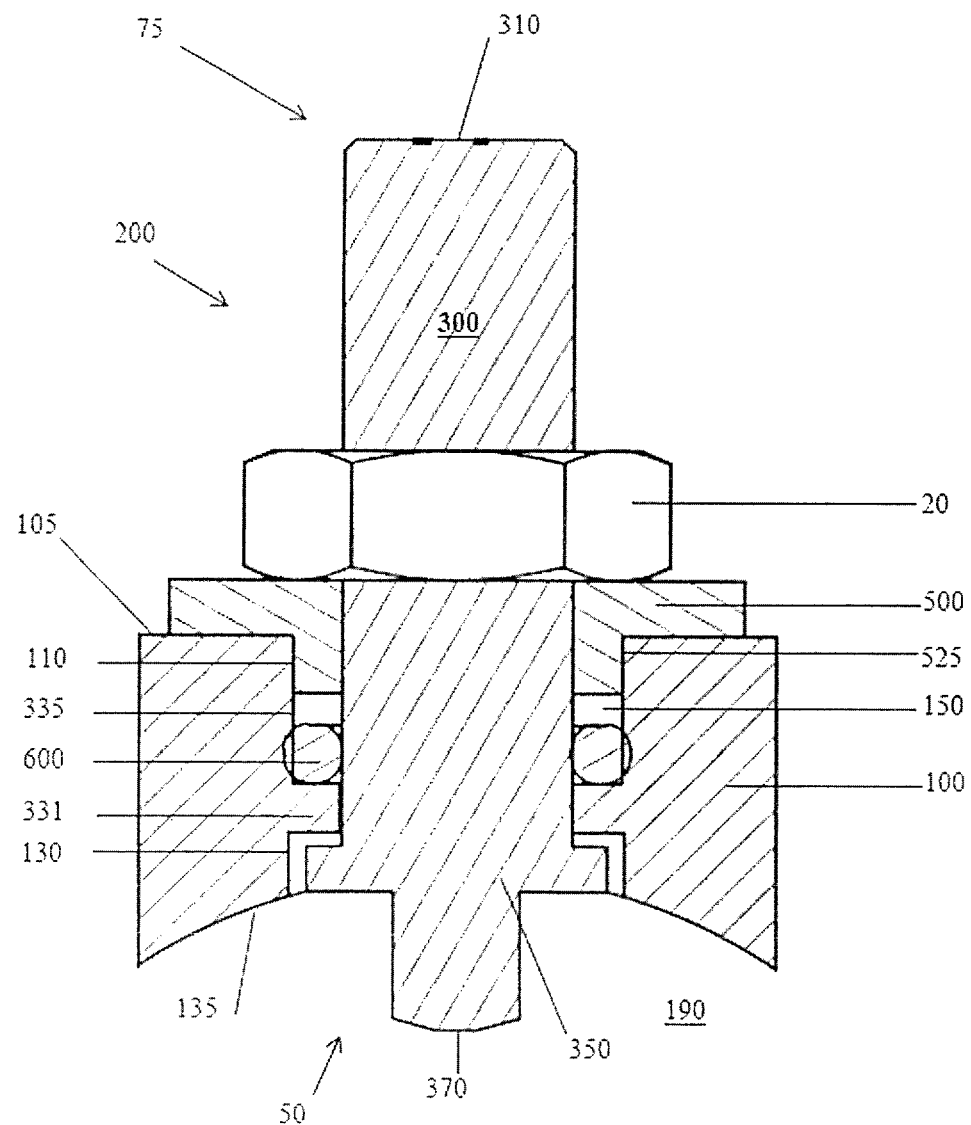
Figure 7E:
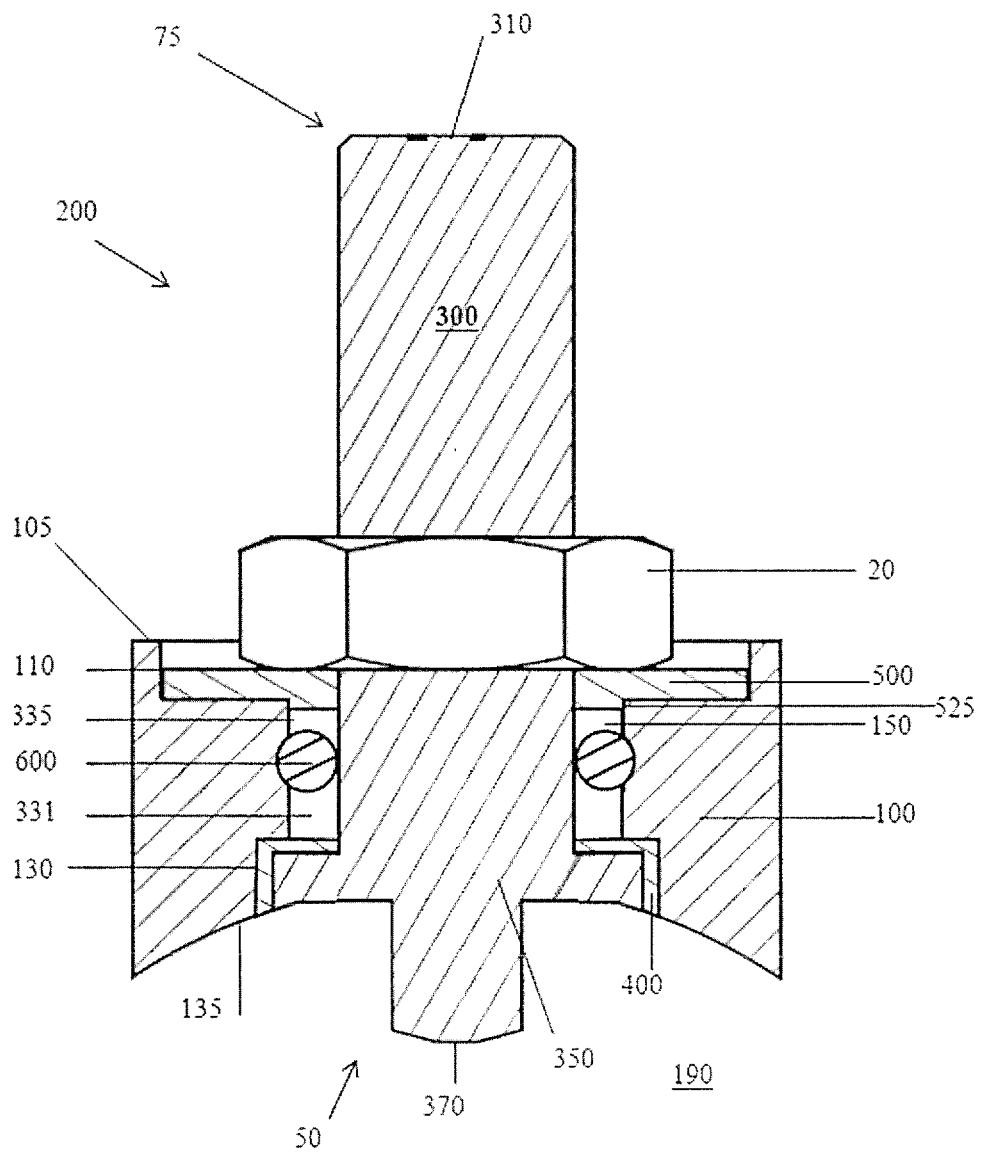

Referring to FIGS. 7A-7F, a variety of embodiments of the subject invention are shown, with some modifications to the embodiment shown in FIG. 1A. FIG. 7E shows the lower bearing cup 400, whereas FIGS. 7A-7D and 7F do not. FIG. 7A shows an embodiment where the upper seat 110 is removed or greatly reduced in size. The upper bearing 500, not shown, can be inserted between the upper section of the valve stem 300 and the upper seat 110 section of the valve body, either by reducing the diameter of the upper section of the valve stem 300 where the upper bearing 500 is located or by having the diameter of the upper seat 110 section of the valve body enlarged to make room for the upper bearing 500. As with all of the embodiments shown in FIGS. 7A-7F, the upper bearing 500 prevents contact between the upper section of the valve stem 300 and the upper seat 110 portion of the valve body, the lower bearing cup 400 prevents contact between the head 350 and the lower seat 130, and the lower bearing cup 400 in combination with the upper bearing 500 prevents contact between the valve body midsection and the valve stem 300 midsection. In FIG. 7A, the valve body midsection is located between the stem seal gland 150 and the lower seat 130.

FIG. 7B shows an embodiment where the upper bearing 500 forms a top surface of the stem seal gland 150 and the upper bearing 500 has a constant outer diameter. FIG. 7C is similar to FIG. 7B, and shows the fastening component can be sunk into the valve body. In a specific embodiment, the entire fastening component can be at or below the upper edge 105 of the valve body. FIG. 7D shows an embodiment where the upper bearing 500 has a portion with a larger diameter that is above the upper seat 110. FIG. 7E shows an embodiment where the fastening component is sunk into the upper seat 110. In a specific embodiment, the entire fastening component can be at or below the upper edge 105. In FIGS. 7B-7E, the portion of the upper bearing 500 that extends down and forms the upper surface of the stem seal gland 150 also limits lateral motion of the valve stem 300, in a direction perpendicular to the longitudinal axis of the valve stem 300 toward the inner surface of the stem seal gland 150 and the inner edge surface of the upper seat 110.

Figure 7F:
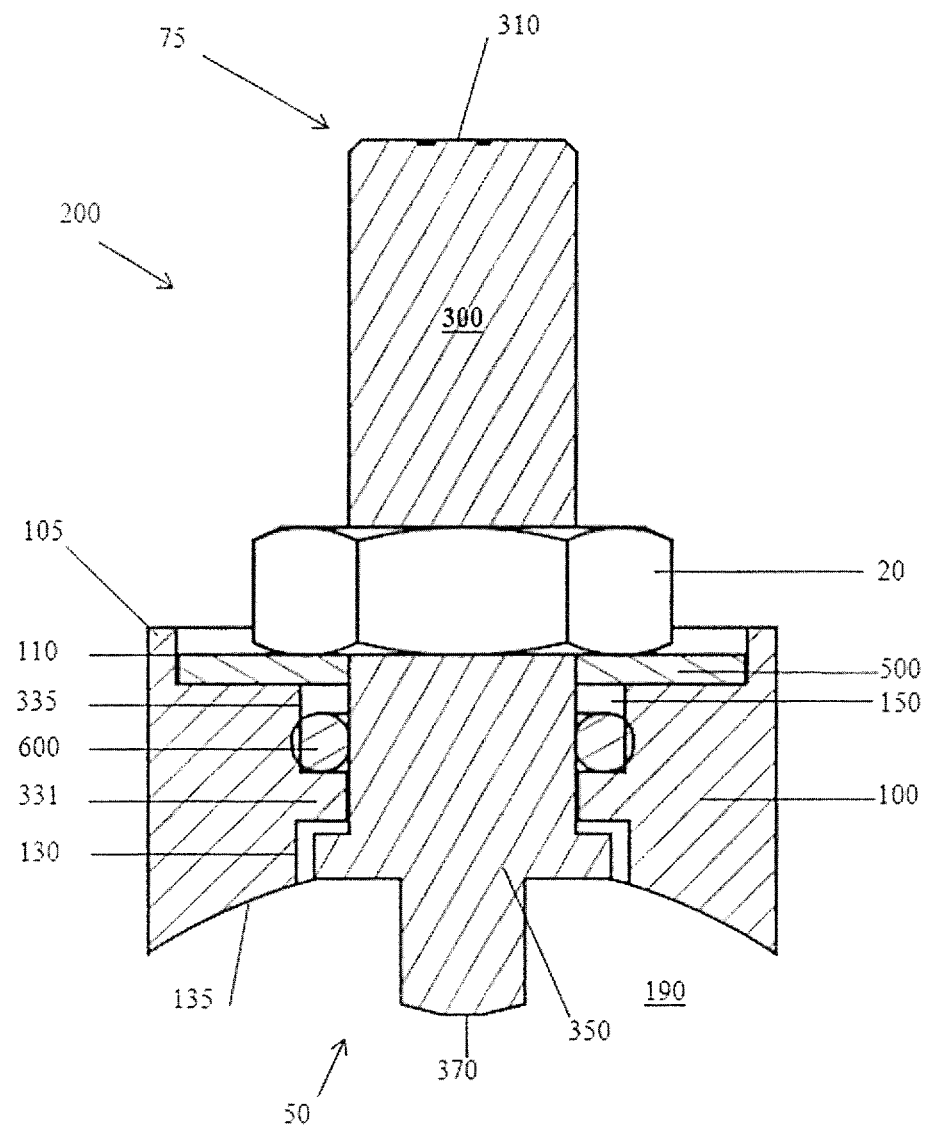

FIG. 7F shows an embodiment where a portion of the upper bearing 500 forms an upper surface of the stem seal gland 150 and the upper bearing 500 limits the lateral motion of the valve stem 300 toward the inner edge surface of the upper seat 110 by the upper bearing 500 contacting the upper section of the valve stem 300 and the inner edge surface of the upper seat 110. FIG. 7E shows an embodiment where the valve body midsection forms the inner edge surface of the stem seal gland 150, the lower bearing cup forms the lower surface of the stem seal gland 150, and the upper bearing forms the upper surface of the stem seal gland 150. Various features of FIGS. 1A and 7A-7C can be combined together to create additional embodiments.

Figure 8E:
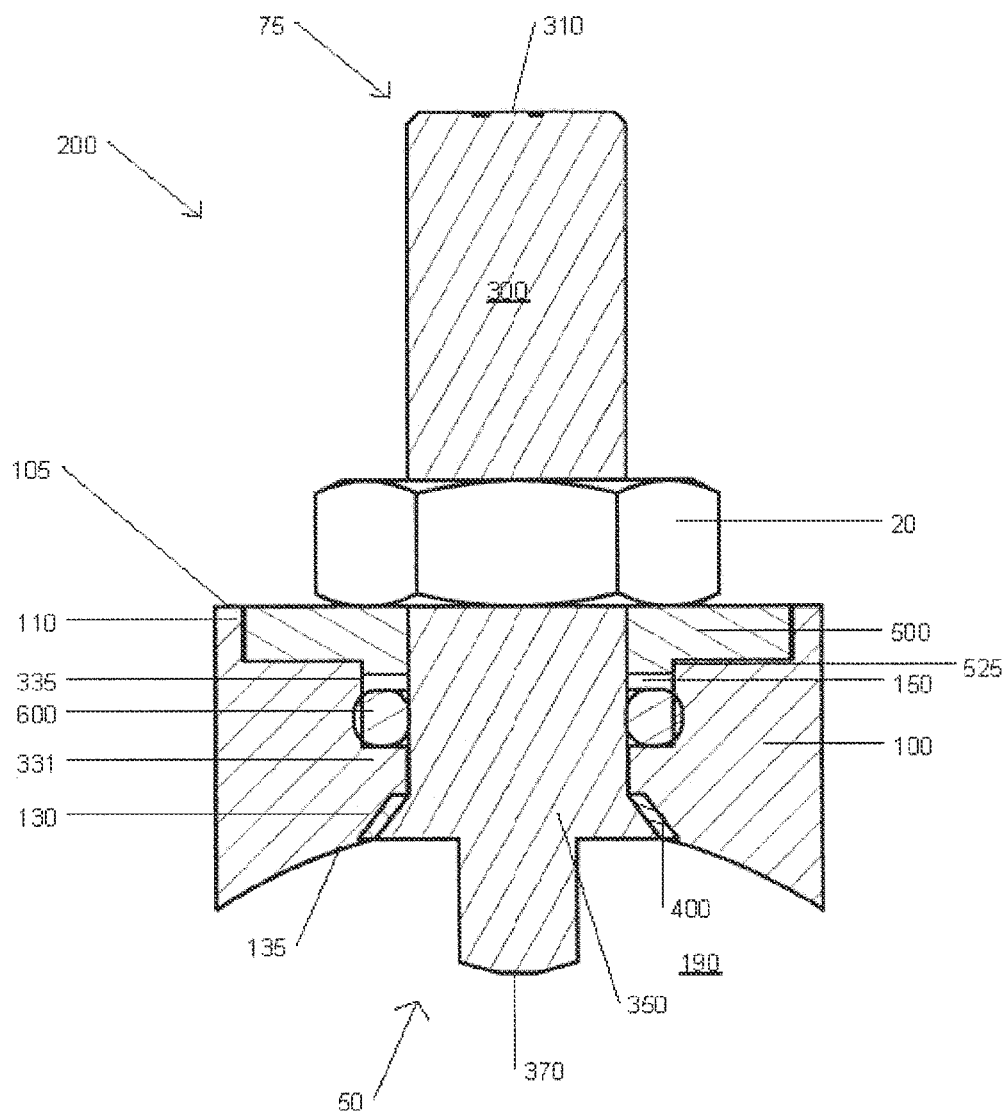
Figure 8F:
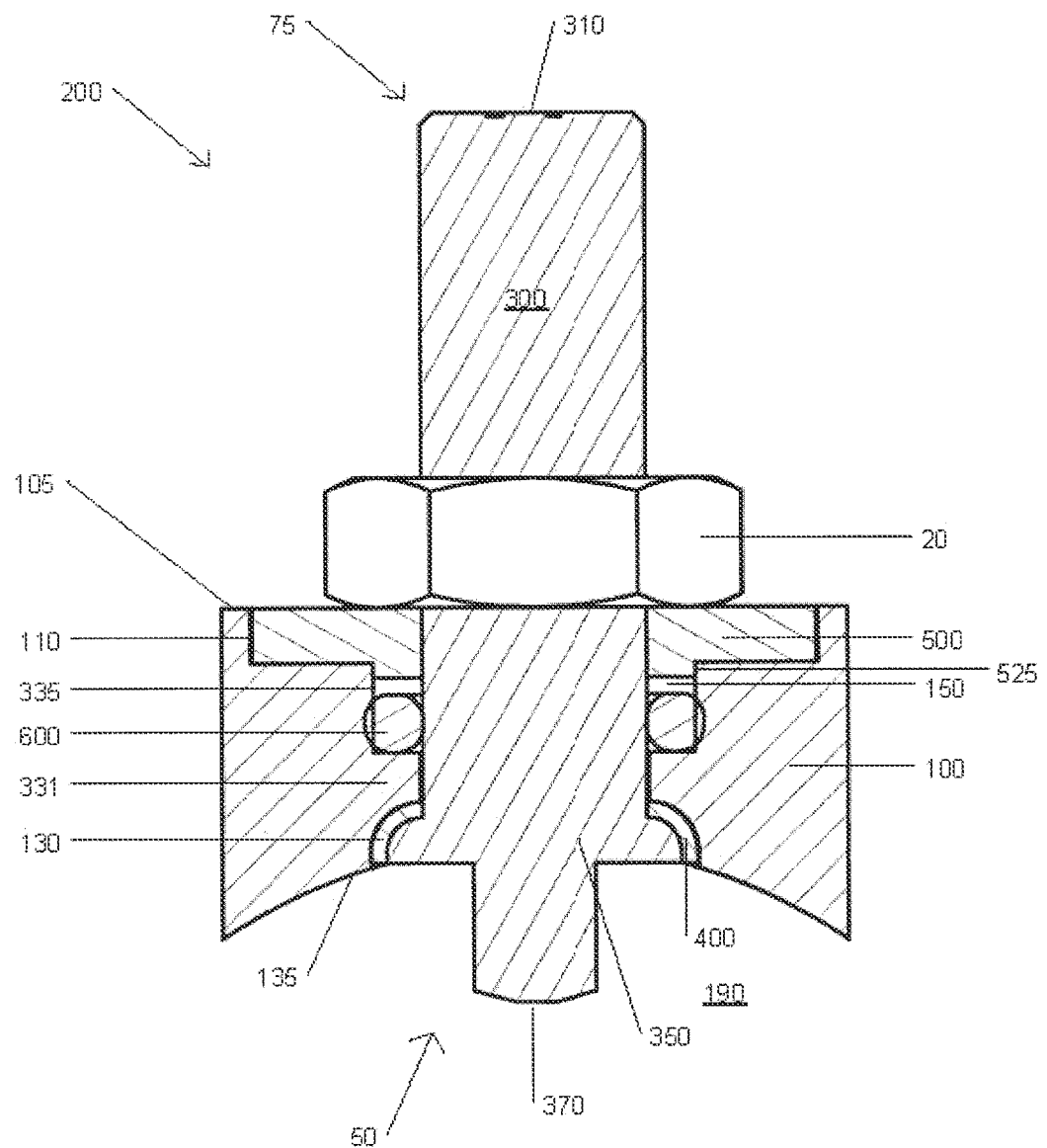

FIGS. 8C-8F show embodiments having various lower seat 130, lower bearing cup 400, and head 350 configurations. FIG. 8E shows an embodiment with a head 350 diameter that linearly increases along the longitudinal axis of the valve stem 300 in the direction of the proximal end. FIG. 8F shows an embodiment with a lower seat 130 and head 350 that is curved when viewed as a cross-section. FIG. 8C shows an embodiment with a head 350 that is similar to the head 350 of the embodiment shown in FIG. 8E, but with a squared-off lower seat 130 and lower bearing cup 400. Likewise, FIG. 8D shows an embodiment with a head 350 that is similar to the head 350 of the embodiment shown FIG. 8F, but with a squared-off lower seat 130 and lower bearing cup 400.

FIG. 9 shows an embodiment similar to FIG. 7E, without a body midsection or a stem midsection. A lower bearing cup 400 extends proximally from the stem seal gland into the lower seat 130. In this embodiment, the lower bearing cup 400 does not fill the entire space between the lower seat 130 and head 350; instead the lower bearing cup 400 occupies a portion of the lower seat 130 area near the head 350. This configuration prevents the trapping of air between the lower bearing cup 400 and the inner wall of the lower seat. In this embodiment, the portion of the lower bearing cap 400 that extends up to the stem seal gland and acts as one wall of the stem seal gland to provide the proximal stem seal gland face. The lower bearing cup 400, in combination with the upper bearing, constrain lateral movement of the head of the stem with respect to the lower seed and constrain lateral movement of the stem with respect to the valve body, where both the lower bearing cup and the upper bearing control such lateral movement by controlling the difference between the body gland section and stem gland section above and below the seal. This also constrains lateral movement of the head 350 relative to the lower seat 130 without the portion of the lower bearing cup between the head and the lower seat constraining the lateral movement of the head relative to the lower seat.

In various specific embodiments, the lower bearing cup 400 and the upper bearing 500 prevent contact between the valve stem 300 and the valve body, limit lateral movement of the upper section of the valve stem 300 to the valve body, limit lateral movement of the head 350 relative to the lower seat 130, and maintain desired spacing between the lower surface of stem seal gland 150 and stem gland portion of valve in order to control stem seal 600 extrusion through same space when the pressure in the bore is below the pressure above the valve body, and also controls spacing between the upper surface of the stem seal gland 150 and the stem gland section of the valve stem 300 in order to control stem seal 600 extrusion through the same space when the pressure in the bore 190 is above the pressure above the valve body.

In further embodiments, the shape of the upper bearing 500 and the upper seat 110 can vary much in the same way as the shape of the lower bearing cup 400 and the lower seat 130, respectively, such that the upper bearing 500 limits lateral movement of the upper section of the valve stem 300, and in embodiments where needed, in conjunction with the fastening component and the face of the upper seat 110, prevents longitudinal movement of the valve stem 300 toward the bore 190.

Another term that can be used for lateral movement of the valve stem 300 relative to the upper seat 110 and/or relative to the lower seat 130 is yawing, which is known in the art. Other terms for through-hole 170, upper seat 110, and lower seat 130 are through bore, counter bore, and back spot face, respectively, which are known in the art.

In a preferred embodiment, the cross-sectional shapes of the stem seal gland 150, stem gland section, stem midsection, and the body midsection are all circular, which enhances stem seal 600 sealing and limits stem seal 600 extrusion under vacuum pressures in the bore, and in a further preferred embodiment the section of the valve body that forms the upper surface of the stem seal gland 150 also has a circular cross-sectional shape.

A lower bearing cup 400 can include any of a diversity of materials. In a specific embodiment, the lower bearing cup 400 made of a "PolyEtherEtherKetone" (PEEK) material. The upper bearing 500 can also be made from a number of materials known in the art, such as PEEK, which can slidably contact the surface of the valve stem 300 and the upper seat 110, and allow the surface of the valve stem 300 and/or the surface of the valve body to slidably contact the upper bearing 500 without galling, or with reduced galling, the surface of the valve stem 300 and/or valve body, respectively. It is well-understood by those with skill in the art that the choice of which one or more material(s) to use for the lower bearing cup 400 can depend upon several factors. Among the factors to consider are, for example, the expected application of the ball valve, which can include consideration of the environmental conditions that the valve assembly would be expected to encounter, the overall dimensions, compatibility with materials of surrounding components, the characteristics of the material, as well as other factors. Environmental conditions can affect a material's expansion, contraction, stress point, contact with surrounding components and other factors that would be known to those with skill in the art. Such factors can affect the ability of the lower bearing cup 400 to provide stabilization and to prevent galling between the valve stem 300 and the valve seat. A person with skill in the art having benefit of the subject application would be able to determine which one or more materials would be suitable for a lower bearing cup 400. Thus, the substitution of materials other than those specifically exemplified herein is also contemplated to be within the scope of the embodiments of the subject invention.

In one particular embodiment, the lower bearing cup 400 is generally circular, such as shown, for example, in FIG. 5A. In a further particular embodiment, the diameter of inner surface 410 is between 0.550 inches and 0.560 inches. In a specific embodiment, the diameter of the inner surface 410 is approximately 0.553 inches. The diameter of the interior surface 420 that comes in contact with the head 350 can be between 0.70 inches and 0.72 inches. In a specific embodiment, the interior surface 420 is approximately 0.718 inches. In another embodiment, the interior surface 420 is approximately 0.715 inches. The diameter of the exterior surface 430 that is in contact with the lower seat 130 can be between 0.790 inches and 0.800 inches. In a further specific embodiment, the diameter of the exterior surface 430 is approximately 0.798 inches. In a further specific embodiment, the thickness 450 of the lower bearing cup 400 is approximately 0.032 inches. Advantageously, the dimensions of the specific embodiment, in conjunction with the use of PEEK for the lower cup material can significantly: 1. stabilize the valve stem 300 by reducing lateral movement of the valve stem 300, and 2. reduce galling between the valve stem 300 and the valve body.

Figure 6:
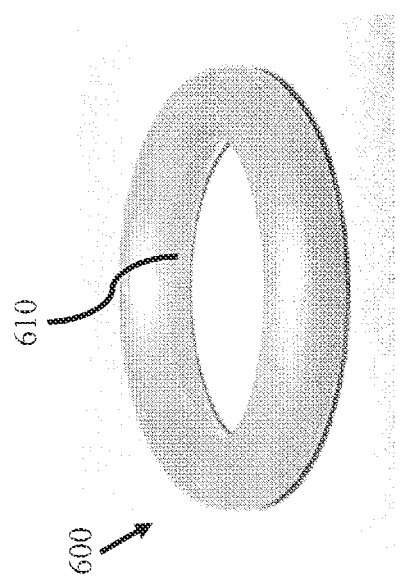
FIG. 6 is a photograph of a typical stem seal that can be used with embodiments of the valve stem assembly of the subject invention.

Proceeding towards the distal end 75 of the through-hole 170, in a further embodiment, the next sealing component is a stem seal 600 located within a stem seal gland 150 (referred to hereafter as the gland). This embodiment is also illustrated in FIG. 1A. The use of stem seals 600 as sealing components is well-known in the art. Typically, but necessarily, a stem seal 600 is a mechanical gasket in the shape of a torus. That is, a loop of an elastomeric material with a disc-shaped cross-section. FIG. 6 shows one embodiment of such a stem seal 600. Usually, a stem seal 600 is designed to be seated within a groove and compressed between two or more parts, creating a seal at the interface. They are commonly used in static or dynamic applications where there is relative motion between the parts and the stem seal 600, such as the valve stem assembly 200 disclosed herein.

The factors that can be considered by those skilled in the art with regard to the choice of materials for each of the components of the various embodiments of the subject invention have been discussed above and are reasserted here with regard to the stem seal 600. Further, the dimensions utilized for a stem seal 600 can also vary depending upon the same, similar, or different factors. Of particular concern with regard to various embodiments is the expansion volume necessary in the gland 150 to ensure sufficient sealing without undesirable extrusion and or galling of the stem seal 600. A further concern is the ability of the stem seal 600 to provide sufficient sealing capability at room temperature, as well as elevated temperatures that the ball valve will likely encounter during extending use or during certain applications. As such, the dimensions of the gland can be particularly relevant with regard to the stem seal 600 expansion capabilities. Ideal compression of the stem seal 600 within the gland can facilitate an adequate seal and reduce or eliminate stem seal 600 galling. In a specific embodiment, ideal stem seal 600 compression is approximately 15%. In a further embodiment, the stem seal 600 compression is in the range 10 to 20%, 12 to 18%, and/or 14 to 16%.

In one embodiment, the gland 150 is a circular bore around the through-hole 170 into which the stem seal 600 is placed to encircle the valve stem 300 at the medial sealing area 330. It should be understood that the dimensions of the gland will vary depending upon the size and type of stem seal 600 utilized. The applicants anticipate that such variations are within the scope of the embodiments of the subject invention. In a further embodiment, the diameter of the gland is between 0.780 inches and 0.784 inches. In a specific embodiment, the diameter of the gland is approximately 0.782 inches. As mentioned above, the diameter of the valve stem 300 can be between 0.546 inches and 0.550 inches. In another embodiment, the diameter of the valve stem 300 can be between 0.540 inches and 0.550 inches. In a specific embodiment, the diameter of the valve stem 300 is approximately 0.548 inches. In specific embodiments of the valve stem 300, the clearance between the valve body 100 and the valve stem 300 is limited to no more than 0.005 inches, or limited to no more than 0.007 inches, which minimizes the risk of stem seal 600 extrusion. Further, when utilized with the above-disclosed specific embodiment of the valve stem 300 having a medial sealing area 330 diameter of approximately 0.548 inches, the stem seal 600 experiences minimal stretching and achieves ideal compression during maximum expansion. Advantageously, the specific embodiments of the subject invention disclosed herein allow a lubricated stem seal 600 of practically any suitable material to be utilized within the gland of the valve stem assembly 200. Some non-limiting examples of stem seals that can be utilized with the specific embodiments disclosed herein are the Viton® fluoroelastomer, Dupont Kalrez® 8575 series, or the Dupont Kalrez® 4079 series or any other type of AS568-207 size.

Figure 1B:
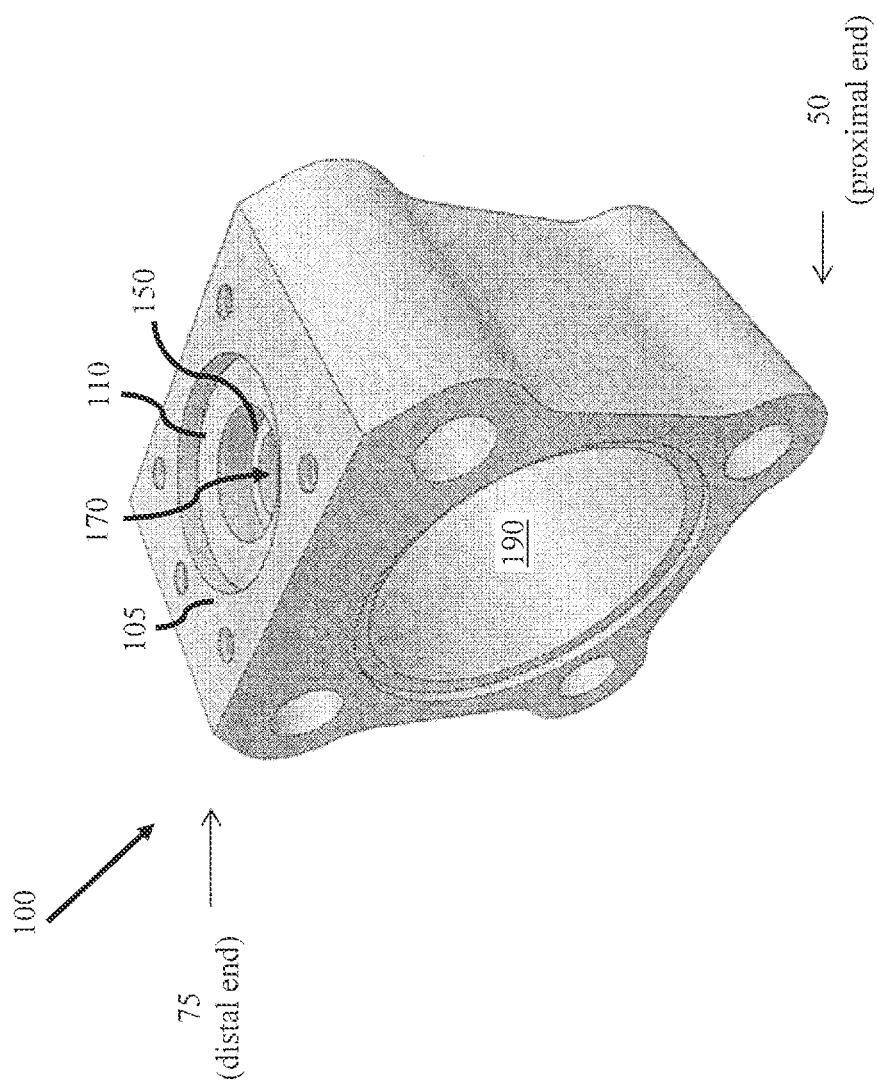
FIG. 1B is a perspective view of one embodiment of the valve body of the subject invention.

Proceeding still further towards the distal end 75 of the through-hole 170, the final component is an upper bearing 500 that can be operatively engaged with an upper seat 110. The upper seat 110, similarly to the lower seat 130, can surround the through-hole 170. In a particular embodiment, the upper seat 110 is circular. As seen in the example shown in FIG. 1B, the most proximal end 150 of the upper seat 110 is contiguous with the stem seal gland 150, while the distal end 75 of the upper seat 110 opens at the distal end of the valve body to define the upper edge 105. In a further embodiment, the first narrow end 310 extends proximally and past the upper edge 105 of the upper seat 110.

An upper bearing 500 can be cooperatively-engaged with the upper seat 110. In general, the upper bearing 500 can be a washer-like insert having a valve stem opening 515 through which the first narrow end 310 can protrude, as shown, for example, in FIGS. 1A and 2A-2B. In one embodiment, the distal end 75 of the upper bearing 500 is substantially flat, particularly near the valve stem opening 515 to benefit the tightening component 20. In an alternative embodiment, the distal end 75 of the upper bearing 500 has one or more structures or features that assist the tightening component, such as, for example, ridges, nibs, depressions, or other features that can engage with the tightening component to maintain the position of the valve stem 300 and compression of the valve stem assembly 200. The upper bearing 500 can be beneficial in stabilizing the distal end 75 of the valve stem 300 and limiting lateral movement thereof.

Specific embodiments do not have an upper seat 110, but, rather, have the stem seal gland 150 extend to the upper edge and a washer positioned in contact with the upper edge to also push on the stem seal 600. In another embodiment without an upper seat 110, the stem seal gland 150 can extend into the wall of the central through hole and the stem seal 600 can be positioned in the gland prior to inserting the valve stem 300.

The factors that can be considered by those skilled in the art with regard to the choice of materials for each of the components of the various embodiments of the subject invention have been discussed above and are restated here with regard to the upper bearing 500. In a specific embodiment, the upper bearing 500 comprises a "PolyEtherEtherKetone" (PEEK) material. Further, the circumferential shape of the upper bearing 500 can vary depending upon the circumferential shape of the upper seat 110. It can be advantageous, but not necessary, for the circumferential shape of the upper bearing 500 and the upper seat 110 to be sufficiently the same. In a specific embodiment, the upper seat 110 and the upper bearing 500 have circular circumferential shapes. In further specific embodiments, the diameter of the upper seat 110 is approximately 2.375 inches, or is approximately 1.375 inches, with a depth from the upper edge 105 to the start of the stem seal gland 150 is approximately 0.075 inches, or approximately 0.135 inches, respectively.

Figure 2B:
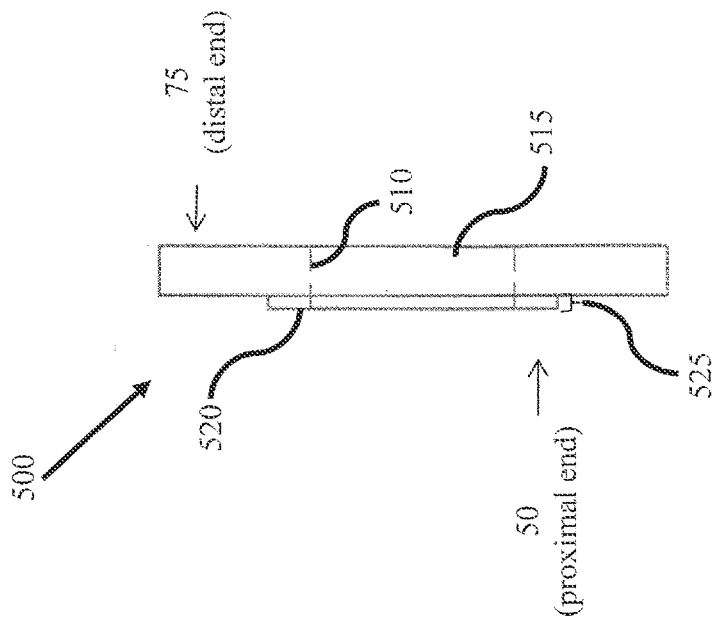
FIGS. 2A and 2B are a top plan view of one embodiment of the upper bearing of the subject invention.
Figure 2A:
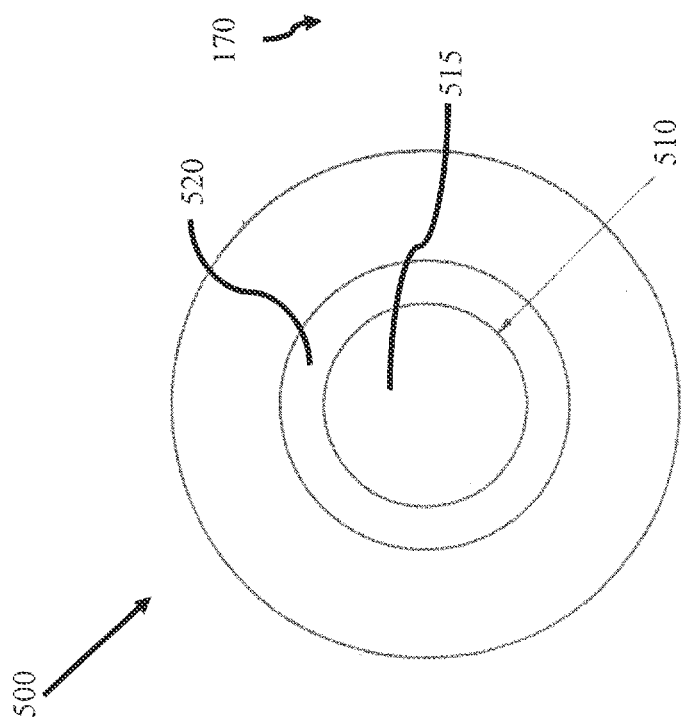

In a further embodiment, the proximal side 50 of the upper bearing 500 includes a step 520, as seen, for example, in FIGS. 2A and 2B, that can descend into the stem seal gland 150, when the upper bearing 500 is placed in the upper seat 110. FIG. 1A illustrates this embodiment. When the step is positioned within the stem seal gland 150, it mimics the functionality of an enclosed stem seal groove. Advantageously, the step 520 can limit axial movement of the stem seal 600, to ensure that it does not extrude onto the threads 311 of the valve stem 300, and further stabilize the distal end 75 of the valve stem 300. A further advantage to the use of a step 520 is that it can significantly reduce manufacturing costs and complexity.

The depth of the step, which can determine how far it descends into the stem seal gland 150, can depend upon, among other factors, the dimensions of the stem seal gland 150 itself. Further, the step depth 525 can be consistent across the entire diameter. In other words, the proximal side 50 of the step 520 can be generally flat. In this embodiment, the step depth 525 is between 0.030 inches and 0.040 inches. In a specific embodiment, the step depth 525 is approximately 0.035 inches. But, alternative embodiments can employ a step 520 wherein the proximal side has one or more slanting surfaces or indentations to compensate for stem seal 600 expansion. In one alternative embodiment, the proximal side of the step has a convex curvature or angle, such that the step descends further into the stem seal gland 150 nearer the valve stem opening 515.

Certainly, the ability of the step 520 to interdigitate with the stem seal gland 150 can be facilitated if their circumferential shapes are compatible. As discussed previously, and restated here, the circumferential shape of the stem seal gland 150 and the stem seal 600 can vary depending upon a variety of factors known to those with skill in the art. Thus, the circumferential shape of the step 520 can also be variable. In a specific embodiment, the circumferential shape of the step is circular, so as to be compatible with specific embodiments of the stem seal 600 and stem seal gland 150 disclosed previously herein. In particular embodiments, the diameter of the step is between 0.780 inches and 0.784 inches, or between 0.7 inches and 0.8 inches. In further specific embodiment, the diameter of the step is approximately 0.782 inches.

The ball valve design disclosed herein is an improvement over current ball valve designs and is useful in a wider variety of applications. The improved valve stem 300 design allows it to function equally well in a wide range of temperatures, depending on stem seal material selection. In one embodiment, temperatures range from 22° C. to 200° C. In another implementation, temperatures range from 200° C. to 300° C. It is anticipated that higher temperature limits will be soon made available as new stem seal materials are made available and these would be incorporated into the design contemplated herein. Specific embodiments pertain to ball valves that are used to maintain a seal between one end, such as the proximal end, of the valve body 100 and the other end, such as the distal end, of the valve body. In a specific embodiment, the proximal end of the valve body, or central through hole, is at vacuum pressure and the distal end of the valve body, or central through hole, is at atmospheric pressure. In further specific embodiments, the vacuum pressure at the proximal end of the valve body is in the range from 760 Torr to $10^{-12}$ Torr, in the range from 760 Torr to $10^{-8}$ Torr, and in the range from $10^{-3}$ Torr to $10^{-8}$ Torr. The improvements in stem seal compression seen in this disclosed new design can reduce extrusion and subsequent undesirable wear on the stem seal 600. Thus, the life of the valve (number of open/close cycles) can be increased. The further use of upper and lower bearings, as disclosed herein, can stabilize the valve stem 300, reduce lateral and axial movement, and eliminate use of copper or other types of metallic washers. In a specific embodiment, an evacuation hole, such as in the ball of the ball valve, can be incorporated.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

The embodiments of the subject invention have been described herein in considerable detail, in order to comply with the Patent Statutes and to provide those skilled in the art with information needed to apply the novel principles, and to construct and use such specialized components as are required. However, it is to be understood that the invention can be carried out by specifically different equipment and devices, and that various modifications, both as to equipment details and operating procedures can be effected without departing from the scope of the invention itself. Further, it should be understood that, although the present invention has been described with reference to specific details of certain embodiments thereof, it is not intended that such details should be regarded as limitations upon the scope of the invention except as and to the extent that they are included in the accompanying claims.

We claim:

1. A valve, comprising:
    a valve body, the valve body having a through hole that passes through a wall of the valve body from an outer wall surface to an inner wall surface,
    wherein a proximal end of the through hole is an opening in the inner wall surface and a distal end of the through hole is an opening in the outer wall surface,
    wherein the through hole comprises:
        a body gland section positioned proximal to the outer wall surface, wherein the body gland section has a circular cross-section having a first radius,
        a body midsection having a circular cross-section having a second radius, and
        a lower seat positioned between the body midsection and the inner wall surface,
    wherein at least a portion of the lower seat has a third radius,
    wherein the second radius is smaller than the first radius, wherein the second radius is smaller than the third radius;
    a valve stem;
    wherein the valve stem comprises:
        a head proximate a proximal end of the valve stem,
        a stem midsection having a circular cross-section,
        a stem gland section, wherein at least a portion of the stem gland section has a circular cross-section, wherein the stem midsection is between the head and the stem gland section; and
        a lower bearing cup,
    wherein the valve body and the valve stem are adapted such that a distal end of the valve stem can enter the proximal end of the through hole and pass into the through hole such that at least a portion of the head is in the lower seat,
    wherein at least a portion of the head has a head radius that is larger than the second radius,
    wherein the head and the lower seat are adapted such that the lower bearing cup can be positioned such that the lower bearing cup prevents contact between a head outer surface and a lower seat inner surface when the valve stem is fully inserted into the through hole,
    wherein the lower bearing cup comprises a first portion and a second portion, wherein when the valve stem is fully inserted into the through hole the lower bearing cup is positioned such that at least a portion of the first portion is between the head and the body midsection and the second portion is positioned between the body midsection and the stem midsection, wherein the second portion constrains lateral movement of the head with respect to the lower seat,
    wherein the stem gland section and the body gland section are adapted such that a stem seal can be positioned around the stem gland section so as to be in contact with a stem gland section outer surface around a circumference of the stem gland section and when the valve stem is fully inserted into the through hole the stem seal is positioned in a stem seal gland, wherein the stem seal gland is formed by the stem gland section outer surface, a body gland section inner surface, a proximal stem seal gland face, and a distal stem seal gland face, wherein the proximal stem seal gland face is a distal face surface of the body midsection,
    wherein when the valve stem is fully inserted into the through hole, the stem seal is positioned around the stem gland section so as to be in contact with the stem gland section outer surface around a circumference of the stem gland section, the stem seal is positioned in the stem seal gland, and a pressure differential is applied between a first region distal to the outer wall surface and a second region proximal to the inner wall surface such that a first pressure of the first region is higher than a second pressure of the second region, a first seal is created between the stem seal and the stem gland section outer surface and a second seal is created between the stem seal and the body gland section inner surface, such that the pressure differential between the first region distal to the outer wall surface and the second region proximal to the inner wall surface is maintained, wherein the first seal and the second seal are maintained as the valve stem is rotated about a longitudinal axis of the valve stem with respect to the valve body.

2. The valve according to claim 1, wherein the valve is a ball valve.

3. The valve according to claim 1, wherein the lower seat has a circular cross-section.

4. The valve according to claim 1, wherein when the distal end of the valve stem enters the proximal end of the through hole and passes into the through hole such that at least a portion of the head is in the lower seat, the distal end of the valve stem extends past the outer wall surface.

5. The valve according to claim 1, wherein the head outer surface comprises a head face and a head outer edge surface, wherein the lower seat inner surface comprises a lower seat face and a lower seat inner edge surface, wherein the lower bearing cup prevents contact between the head face and the lower seat face and prevents contact between the head outer edge surface and the lower seat inner edge surface when the valve stem is fully inserted into the through hole.

6. The valve according to claim 5, further comprising:
wherein when the valve stem is fully inserted into the through hole the lower bearing cup is positioned so as to prevent contact between the head face and the lower seat face and to prevent contact between the head outer edge surface and the lower seat inner edge surface.

7. The valve according to claim 6, wherein the second portion keeps lateral movement of the head with respect to the lower seat to below or equal to a maximum lateral movement, wherein lateral movement above the maximum lateral movement leads to improper extrusion of the stem seal between the stem gland section outer surface and the proximal stem seal gland face.

8. The valve according to claim 7, wherein the head has a circular cross-section having a head radius, wherein the lower seat has a circular cross-section having the third radius, wherein the difference between the head radius and the third radius is less than or equal to a thickness of the second portion of the lower bearing cup plus the maximum lateral movement.

9. The valve according to claim 2, further comprising a ball, wherein the valve stem further comprises a protrusion extending proximally from the head such that when the valve stem is fully extended into the through hole the protrusion extends proximally past the inner wall surface and engages the ball such that when the valve stem is rotated about a longitudinal axis of the valve stem the ball rotates.

10. The valve according to claim 1, further comprising a means for securing the valve stem in place with the valve stem fully inserted into the through hole.

11. The valve according to claim 1, further comprising:
threads on a threaded portion of the valve stem, wherein the threaded portion of the valve stem is distal to the stem gland section; and
a component threadably engageable with the threads on the threaded portion of the valve stem, wherein threadably engaging the component with the threads on the threaded portion of the valve stem secures the valve stem in place.

12. The valve according to claim 1, wherein the through hole comprises an upper section having a circular cross-section having a fourth radius, wherein the upper section is distal to the body seal gland section, wherein the fourth radius is the same as the second radius, wherein a proximal face of the upper section is the proximal stem seal gland face.

13. The valve according to claim 1, further comprising an upper bearing, wherein the upper bearing is positioned between the stem and the valve body at a position distal to the stem seal when the valve stem is fully inserted into the through hole and the pressure differential is applied, wherein the upper bearing in combination with the lower bearing cup prevents contact between the valve stem and the through hole.

14. The valve according to claim 13, wherein the through hole comprises an upper seat, wherein the upper seat has a radius at least as large as the second radius at each position around a circumference of the upper seat, wherein at least a portion of the upper bearing is positioned in the upper seat when the valve stem is fully inserted into the through hole.

15. The valve according to claim 13, wherein the upper bearing in combination with the lower bearing cup prevents contact between the valve stem and the through hole as the valve stem is rotated up to 90 degrees about a longitudinal axis of the valve stem.

16. The valve according to claim 13, wherein at least a portion of a proximal face of the upper bearing is the proximal stem seal gland face.

17. The valve according to claim 13, wherein the upper bearing comprises a main upper bearing body and a step at a proximal end of the upper bearing, wherein the step is positioned in the body gland section when the valve stem is fully inserted into the through hole such that an outer edge surface of the step contacts a portion of an inner radial surface of the body gland section that is continuous with an inner radial surface of the stem seal gland, wherein a proximal face of the step is the distal stem seal gland face.

18. The valve according to claim 17, wherein the step in combination with the lower bearing cup prevents contact between a stem midsection outer surface and a body midsection inner surface.

19. The valve according to claim 18, wherein the step keeps lateral movement of the stem with respect to the body gland section to below or equal to a maximum lateral movement, wherein lateral movement above the maximum lateral movement leads to improper extrusion of the stem seal between the stem gland section outer surface and the proximal stem seal gland face.

20. The valve according to claim 19, wherein the step has an annular cross-section having an inner step radius and an outer step radius, wherein the difference between the inner step radius and a radius of a section of the stem that contacts the step plus the difference between the first radius and the outer step radius is less than or equal to the maximum lateral movement.

21. A valve, comprising:
a valve body, the valve body having a through hole that passes through a wall of the valve body from an outer wall surface to an inner wall surface,
wherein a proximal end of the through hole is an opening in the inner wall surface and a distal end of the through hole is an opening in the outer wall surface,
wherein the through hole comprises:
a body gland section positioned proximal to the outer wall surface, wherein the body gland section has a circular cross-section having a first radius, and
a lower seat positioned between the body gland section and the inner wall surface,
wherein at least a portion of the lower seat has a second radius,
wherein the second radius is larger than the first radius;
a valve stem;
wherein the valve stem comprises:
a head proximate a proximal end of the valve stem, and
a stem gland section, wherein at least a portion of the stem gland section has a circular cross-section, wherein the stem gland section is distal to the head; and
a lower bearing cup,
wherein the valve body and the valve stem are adapted such that a distal end of the valve stem can enter the proximal end of the through hole and pass into the through hole such that at least a portion of the head is in the lower seat,
wherein at least a portion of the head has a head radius that is larger than the first radius,
wherein the head and the lower seat are adapted such that the lower bearing cup can be positioned such that the lower bearing cup prevents contact between a head outer surface and a lower seat inner surface when the valve stem is fully inserted into the through hole,
wherein the lower bearing cup comprises a first portion and a second portion, wherein when the valve stem is fully inserted into the through hole the lower bearing cup is positioned such that at least a portion of the first portion is between the head and the body gland section and the second portion is positioned between the body gland section and the stem gland section, wherein the second portion constrains lateral movement of the head with respect to the lower seat, wherein the stem gland section and the body gland section are adapted such that a stem seal can be positioned around the stem gland section so as to be in contact with a stem gland section outer surface around a circumference of the stem gland section and when the valve stem is fully inserted into the through hole the stem seal is positioned in a stem seal gland, wherein the stem seal gland is formed by the stem gland section outer surface, a body gland section inner surface, a proximal stem seal gland face, and a distal stem seal gland face, wherein when the valve stem is fully inserted into the through hole, the stem seal is positioned around the stem gland section so as to be in contact with the stem gland section outer surface around a circumference of the stem gland section, the stem seal is positioned in the stem seal gland, and a pressure differential is applied between a first region distal to the outer wall surface and a second region proximal to the inner wall surface such that a first pressure of the first region is higher than a second pressure of the second region, a first seal is created between the stem seal and the stem gland section outer surface and a second seal is created between the stem seal and the body gland section inner surface, such that the pressure differential between the first region distal to the outer wall surface and the second region proximal to the inner wall surface is maintained, wherein the first seal and the second seal are maintained as the valve stem is rotated about a longitudinal axis of the valve stem with respect to the valve body.

22. The valve according to claim 21, wherein the valve is a ball valve.

23. The valve according to claim 21, wherein the head outer surface comprises a head face and a head outer edge surface, wherein the lower seat inner surface comprises a lower seat face and a lower seat inner edge surface, wherein the lower bearing cup prevents contact between the head face and the lower seat face and prevents contact between the head outer edge surface and the lower seat inner edge surface when the valve stem is fully inserted into the through hole.

24. The valve according to claim 21, wherein the lower bearing cup provides the proximal stem seal gland face.

25. The valve according to claim 21, wherein the lower seat has a circular cross-section.

26. The valve according to claim 21, wherein when the distal end of the valve stem enters the proximal end of the through hole and passes into the through hole such that at least a portion of the head is in the lower seat, the distal end of the valve stem extends past the outer wall surface.

27. The valve according to claim 23,
wherein when the valve stem is fully inserted into the through hole the lower bearing cup is positioned so as to prevent contact between the head face and the lower seat face and to prevent contact between the head outer edge surface and the lower seat inner edge surface.

28. The valve according to claim 27, wherein the second portion keeps lateral movement of the head with respect to the lower seat to below or equal to a maximum lateral movement, wherein lateral movement above the maximum lateral movement leads to improper extrusion of the stem seal between the stem gland section outer surface and the proximal stem seal gland face.

29. The valve according to claim 28, wherein the head has a circular cross-section having a head radius, wherein the lower seat has a circular cross-section having the third radius, wherein the difference between the head radius and the third radius is less than or equal to a thickness of the second portion of the lower bearing cup plus the maximum lateral movement.

30. The valve according to claim 22, further comprising a ball, wherein the valve stem further comprises a protrusion extending proximally from the head such that when the valve stem is fully extended into the through hole the protrusion extends proximally past the inner wall surface and engages the ball such that when the valve stem is rotated about a longitudinal axis of the valve stem the ball rotates.

31. The valve according to claim 21, further comprising a means for securing the valve stem in place with the valve stem fully inserted into the through hole.

32. The valve according to claim 21, further comprising:
threads on a threaded portion of the valve stem, wherein the threaded portion of the valve stem is distal to the stem gland section; and
a component threadably engageable with the threads on the threaded portion of the valve stem, wherein threadably engaging the component with the threads on the threaded portion of the valve stem secures the valve stem in place.

33. The valve according to claim 21, wherein the through hole comprises an upper section having a circular cross-section having a fourth radius, wherein the upper section is distal to the body seal gland section, wherein the fourth radius is the same as the second radius, wherein a proximal face of the upper section is the proximal stem seal gland face.

34. The valve according to claim 21, further comprising an upper bearing, wherein the upper bearing is positioned between the stem and the valve body at a position distal to the stem seal when the valve stem is fully inserted into the through hole and the pressure differential is applied, wherein the upper bearing in combination with the lower bearing cup prevents contact between the valve stem and the through hole.

35. The valve according to claim 34, wherein the through hole comprises an upper seat, wherein the upper seat has a radius at least as large as the second radius at each position around a circumference of the upper seat, wherein at least a portion of the upper bearing is positioned in the upper seat when the valve stem is fully inserted into the through hole.

36. The valve according to claim 34, wherein the upper bearing in combination with the lower bearing cup prevents contact between the valve stem and the through hole as the valve stem is rotated up to 90 degrees about a longitudinal axis of the valve stem.

37. The valve according to claim 34, wherein at least a portion of a proximal face of the upper bearing is the proximal stem seal gland face.

38. The valve according to claim 34, wherein the upper bearing comprises a main upper bearing body and a step at a proximal end of the upper bearing, wherein the step is positioned in the body gland section when the valve stem is fully inserted into the through hole such that an outer edge surface of the step contacts a portion of an inner radial surface of the body gland section that is continuous with an inner radial surface of the stem seal gland, wherein a proximal face of the step is the distal stem seal gland face.

39. The valve according to claim 38, wherein the step in combination with the lower bearing cup prevents contact between a stem midsection outer surface and a body midsection inner surface.

40. The valve according to claim 39, wherein the step keeps lateral movement of the stem with respect to the body gland section to below or equal to a maximum lateral movement, wherein lateral movement above the maximum lateral movement leads to improper extrusion of the stem seal between the stem gland section outer surface and the proximal stem seal gland face.

41. The valve according to claim 40, wherein the step has an annular cross-section having an inner step radius and an outer step radius, wherein the difference between the inner step radius and a radius of a section of the stem that contacts the step plus the difference between the first radius and the outer step radius is less than or equal to the maximum lateral movement.

42. The valve according to claim 21, wherein the lower bearing cup provides the proximal stem seal gland face.

43. The valve according to claim 1, wherein the head radius linearly increases along the longitudinal axis of the valve stem in the proximal direction, wherein the lower seat inner surface has a lower seat face and a lower seat inner edge surface, wherein the lower seat inner edge surface has a radius that linearly increases along the longitudinal axis of the valve stem in the proximal direction.

44. The valve according to claim 1, wherein a cross section of the inner surface of the lower seat in a vertical plane intersecting the longitudinal axis is curved, wherein a cross section of the outer surface of the head in a vertical plane intersecting the longitudinal axis is curved.

45. The valve according to claim 1, wherein the head radius linearly increases along the longitudinal axis of the valve stem in the proximal direction, wherein the lower seat inner surface has a lower seat face and a lower seat inner edge surface, wherein the lower seat inner edge surface has a radius that is constant along the longitudinal axis of the valve stem in the proximal direction.

46. The valve according to claim 1, wherein a cross section of the outer surface of the head in a vertical plane intersecting the longitudinal axis is curved, wherein the lower seat inner surface has a lower seat face and a lower seat inner edge surface, wherein the lower seat inner edge surface has a radius that is constant along the longitudinal axis of the valve stem in the proximal direction.

47. The valve according to claim 21, wherein the head radius linearly increases along the longitudinal axis of the valve stem in the proximal direction, wherein the lower seat inner surface has a lower seat face and a lower seat inner edge surface, wherein the lower seat inner edge surface has a radius that linearly increases along the longitudinal axis of the valve stem in the proximal direction.

48. The valve according to claim 21, wherein a cross section of the inner surface of the lower seat in a vertical plane intersecting the longitudinal axis is curved, wherein a cross section of the outer surface of the head in a vertical plane intersecting the longitudinal axis is curved.

49. The valve according to claim 21, wherein the head radius linearly increases along the longitudinal axis of the valve stem in the proximal direction, wherein the lower seat inner surface has a lower seat face and a lower seat inner edge surface, wherein the lower seat inner edge surface has a radius that is constant along the longitudinal axis of the valve stem in the proximal direction.

50. The valve according to claim 21, wherein a cross section of the outer surface of the head in a vertical plane intersecting the longitudinal axis is curved, wherein the lower seat inner surface has a lower seat face and a lower seat inner edge surface, wherein the lower seat inner edge surface has a radius that is constant along the longitudinal axis of the valve stem in the proximal direction.

* * * * *